(12) United States Patent
Sasaki

(10) Patent No.: US 6,781,790 B1
(45) Date of Patent: Aug. 24, 2004

(54) THIN FILM MAGNETIC HEAD HAVING A WRITE GAP LAYER

(75) Inventor: Yoshitaka Sasaki, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/654,416

(22) Filed: Sep. 1, 2000

(30) Foreign Application Priority Data

Sep. 2, 1999 (JP) .......................................... 11-249220

(51) Int. Cl.$^7$ .......................... G11B 5/147; G11B 5/17; G11B 5/23
(52) U.S. Cl. ........................ 360/126; 360/123; 360/119
(58) Field of Search ................................ 360/125, 126, 360/123, 119, 120, 121, 317, 318, 110

(56) References Cited

U.S. PATENT DOCUMENTS

| | | | |
|---|---|---|---|
| 4,651,248 A | * 3/1987 | Shiiki et al. | 360/119 |
| 5,253,134 A | * 10/1993 | Kato et al. | 360/126 |
| 5,555,147 A | * 9/1996 | Maruyama | 360/317 |
| 5,699,605 A | * 12/1997 | Amin et al. | 29/603.14 |
| 5,828,533 A | * 10/1998 | Ohashi et al. | 360/126 |
| 6,034,848 A | * 3/2000 | Garfunkel et al. | 360/126 |
| 6,130,809 A | * 10/2000 | Santini | 360/317 |

FOREIGN PATENT DOCUMENTS

JP 8-87717 4/1996

* cited by examiner

Primary Examiner—Julie Anne Watko
(74) Attorney, Agent, or Firm—Oliff & Berridge, PLC

(57) ABSTRACT

A write gap layer 29 is formed such that a first magnetic layer 28 constituting a bottom pole chip and a bottom pole is covered with the write gap layer, a thin film coil 30 is formed in a recess 28a provided in a surface of the first magnetic layer such that 50–80% of the thin film coil is embedded in the recess, and after forming a first insulating film 31 in the recess such that a plurality of coil windings of the thin film coil are supported in an electrically isolated manner, a second insulating layer 32 is formed to cover the first insulating layer 31 and write gap layer 29 and extend beyond an outer edge of the recess up to a throat height zero reference position $TH_0$. Then, a second magnetic layer 33 is formed on the second insulating layer. Even if an apex angle θ defined by an inclination angle of a front portion of the second insulating layer 32 is reduced, a distance $L_0$ from the throat height zero reference position $TH_0$ to an outer edge of the thin film coil can be shortened and a magnetic path length $L_1$ can be also shortened. Therefore, it is possible to provide a thin film magnetic head, in which a fine structure of a pole portion can be formed precisely, a recording efficiency can be improved, and NLTS and high frequency properties can be improved.

11 Claims, 41 Drawing Sheets

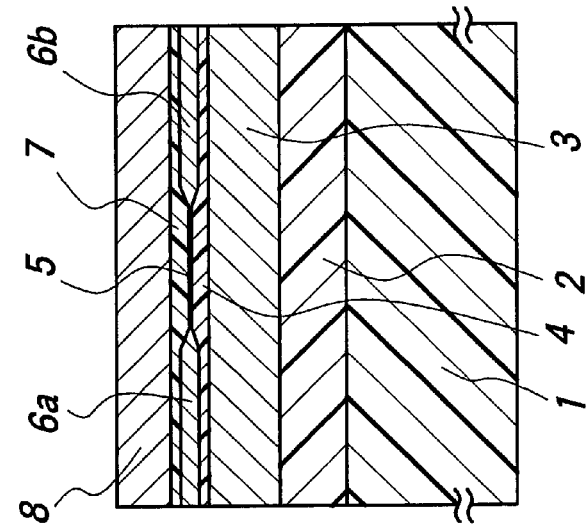
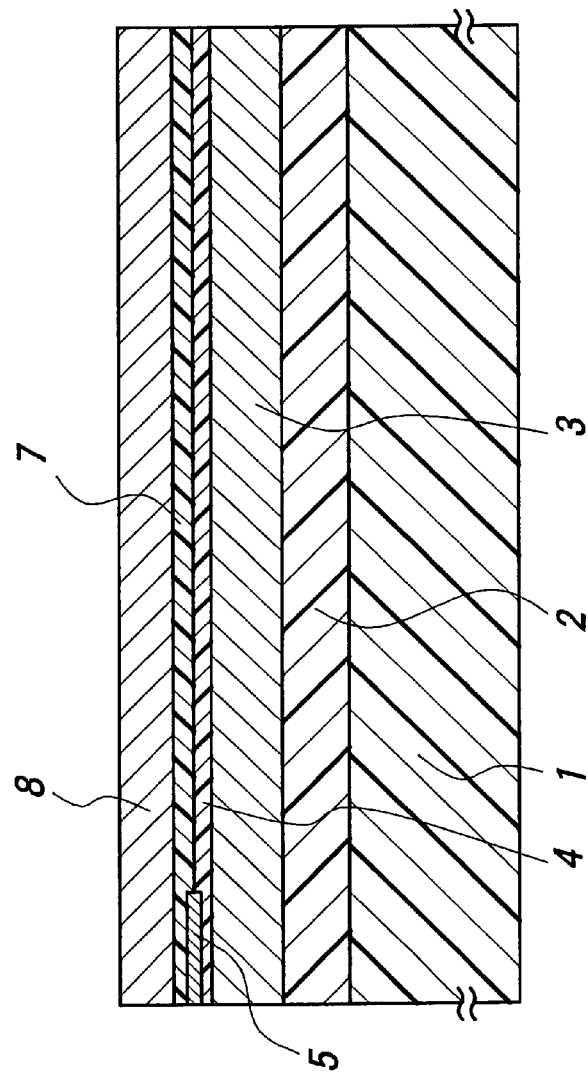

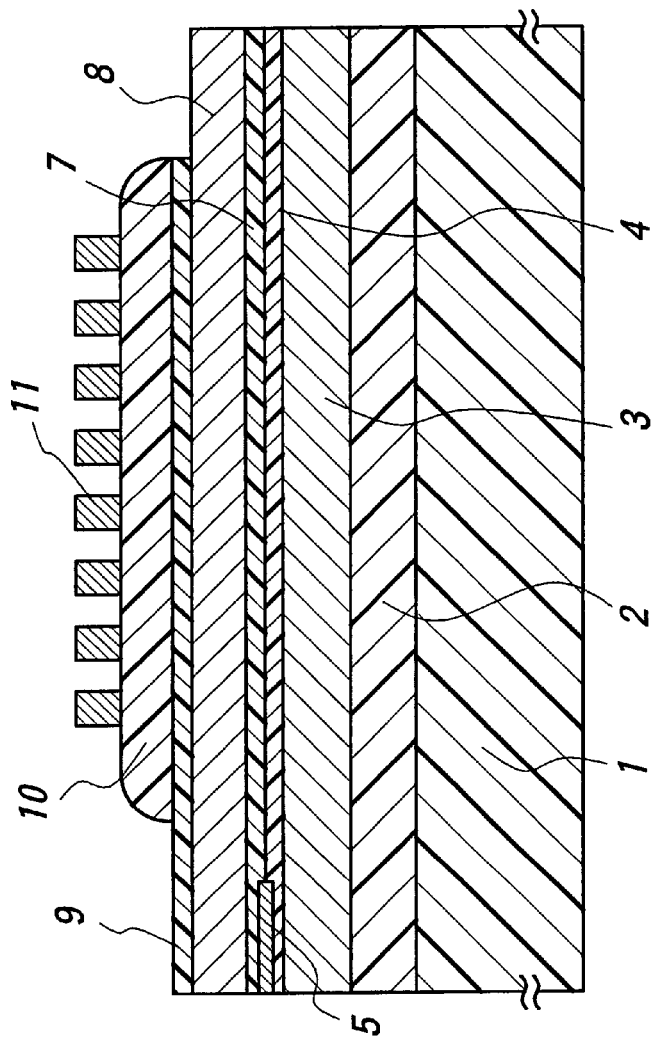

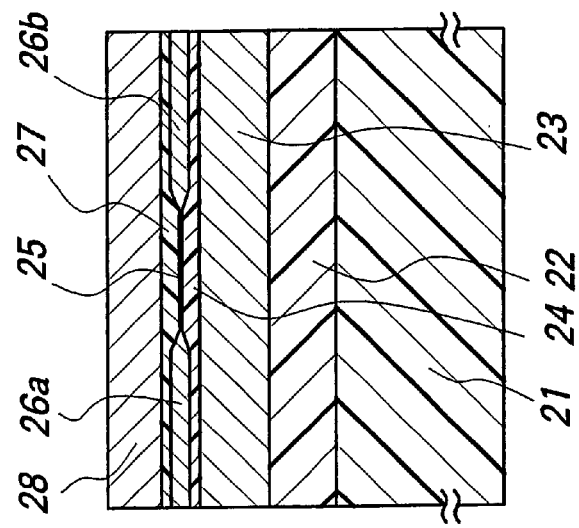
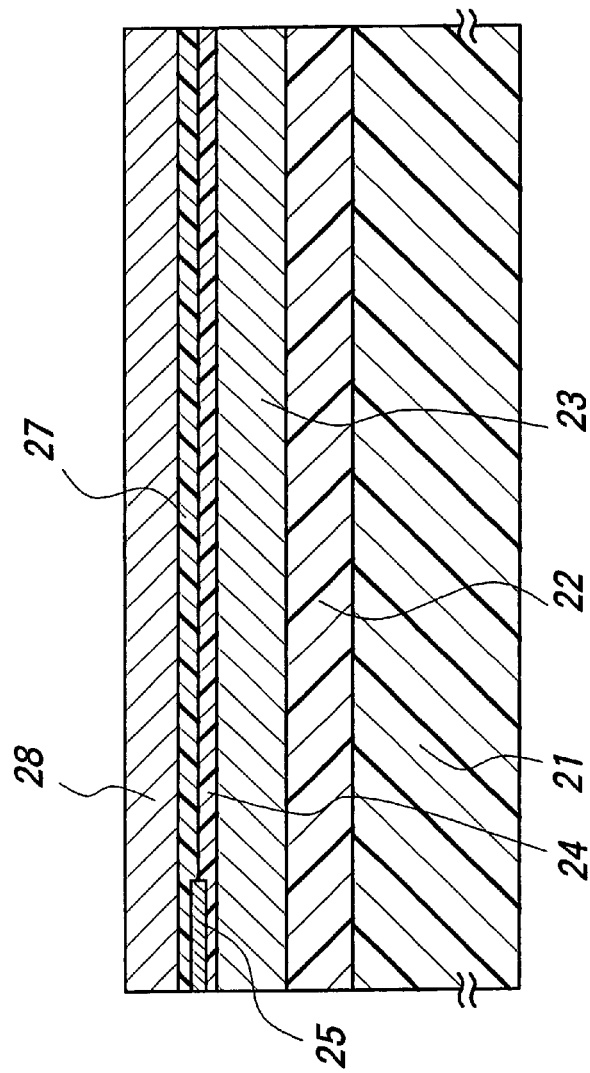

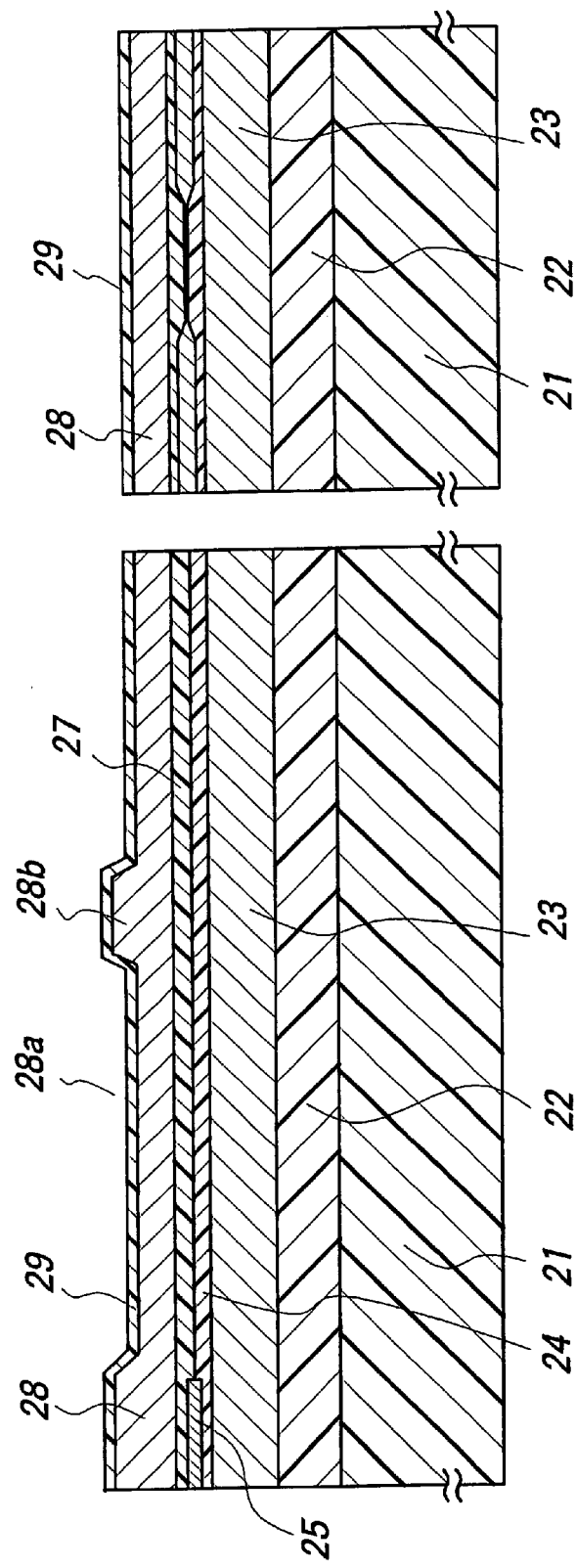

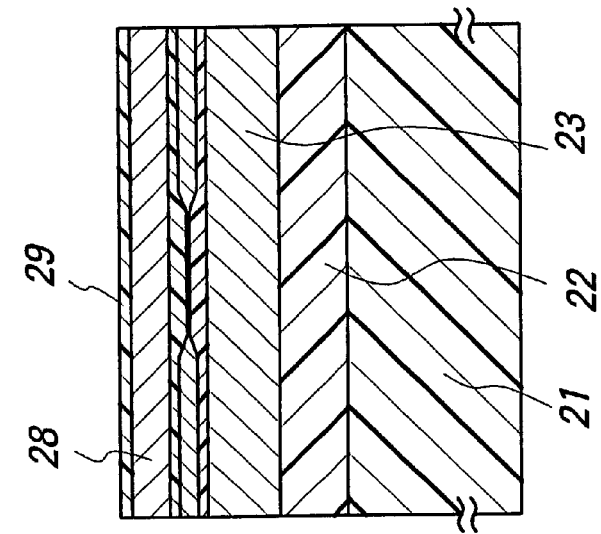
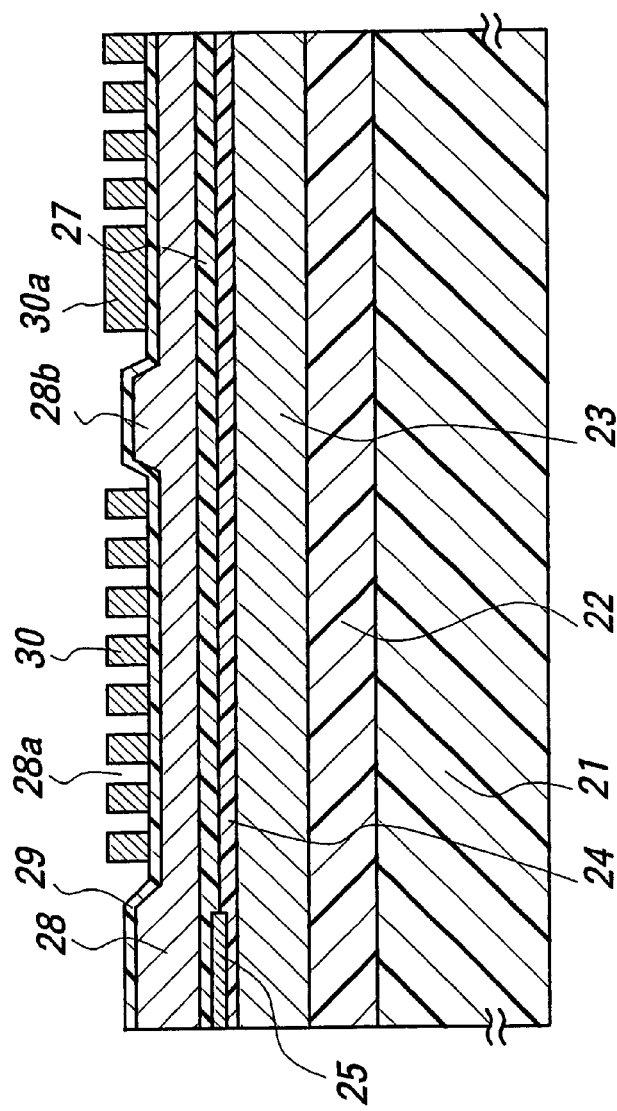

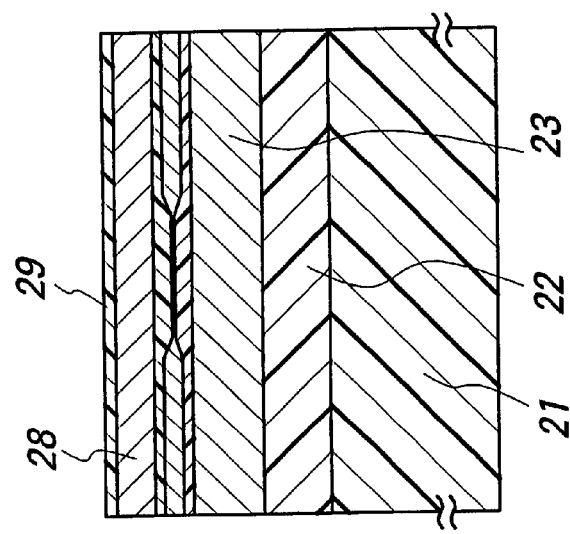
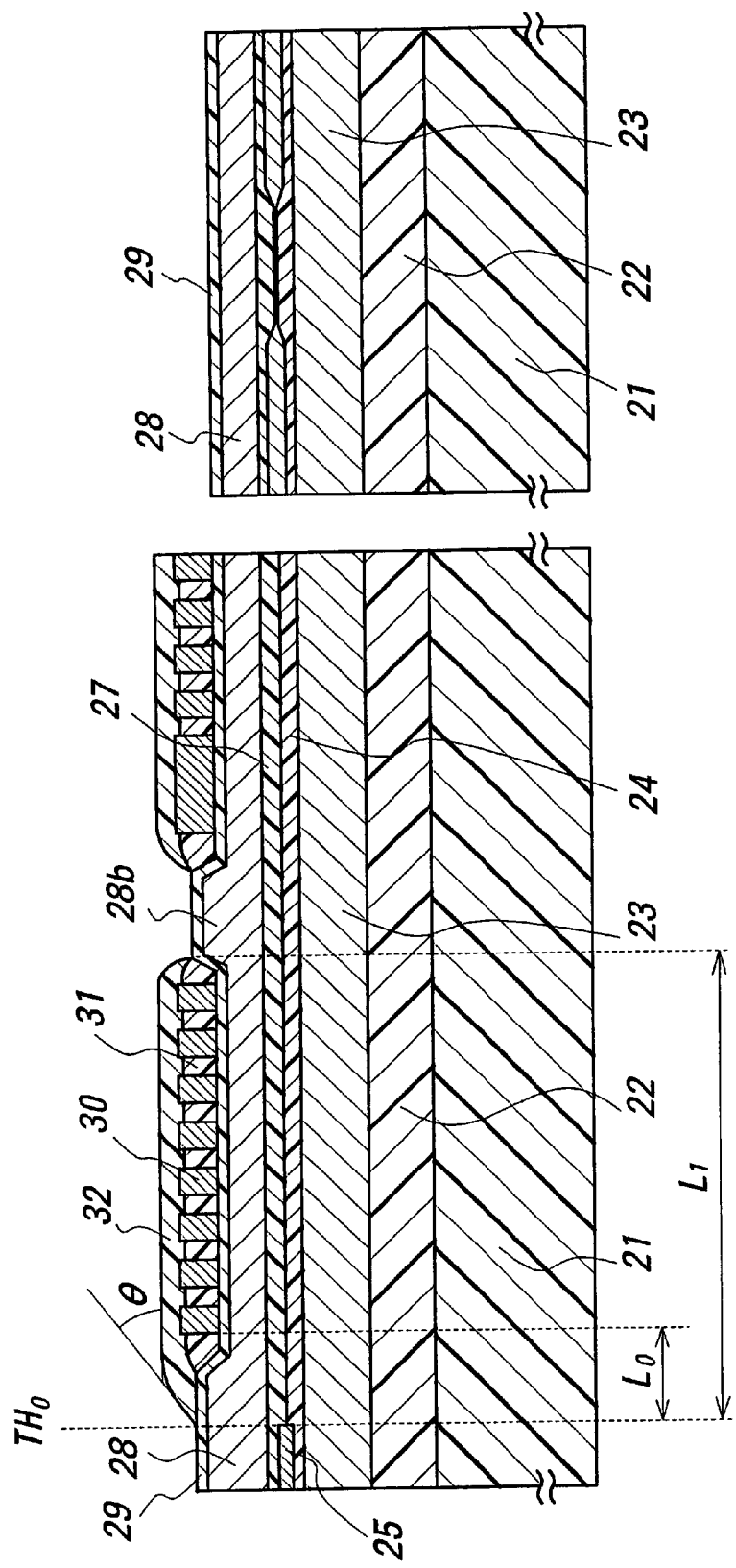

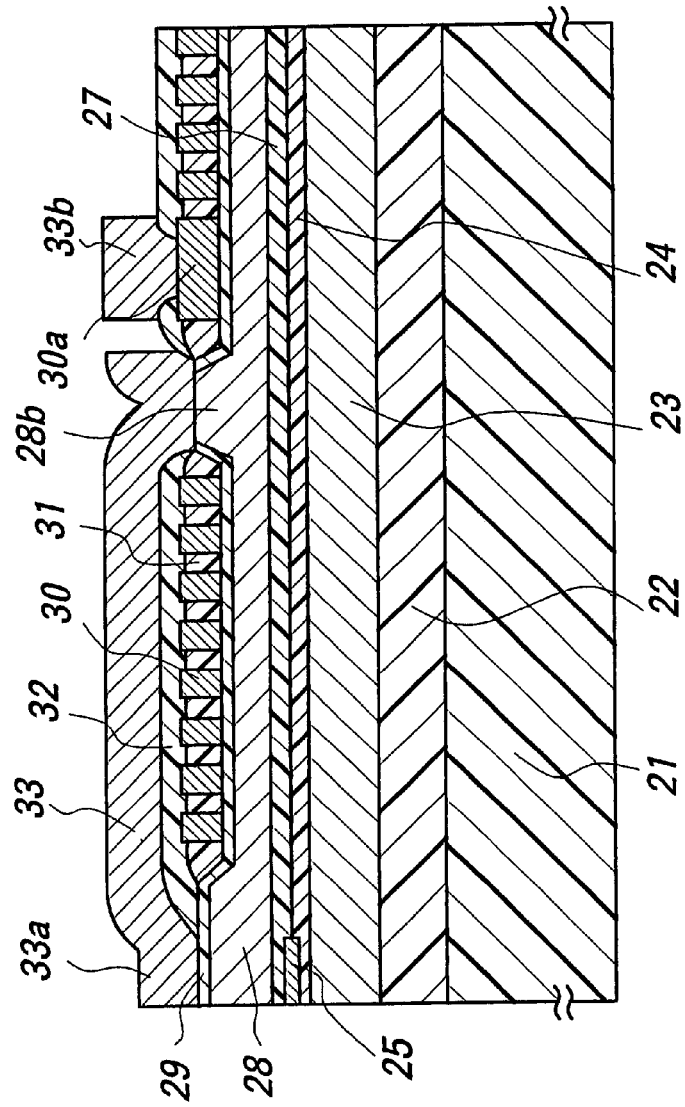
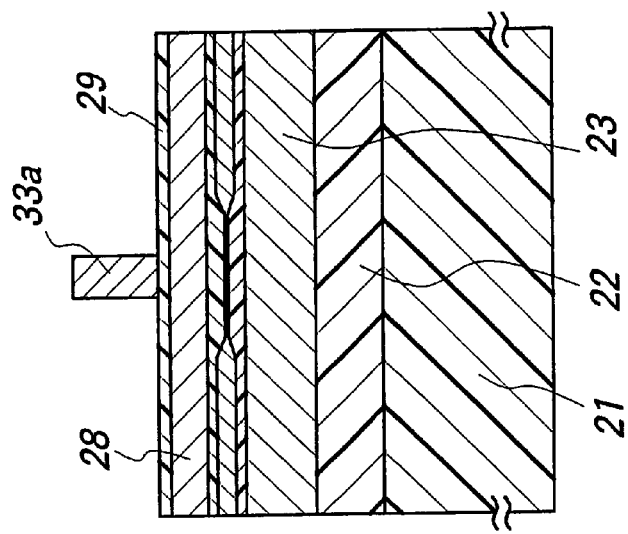

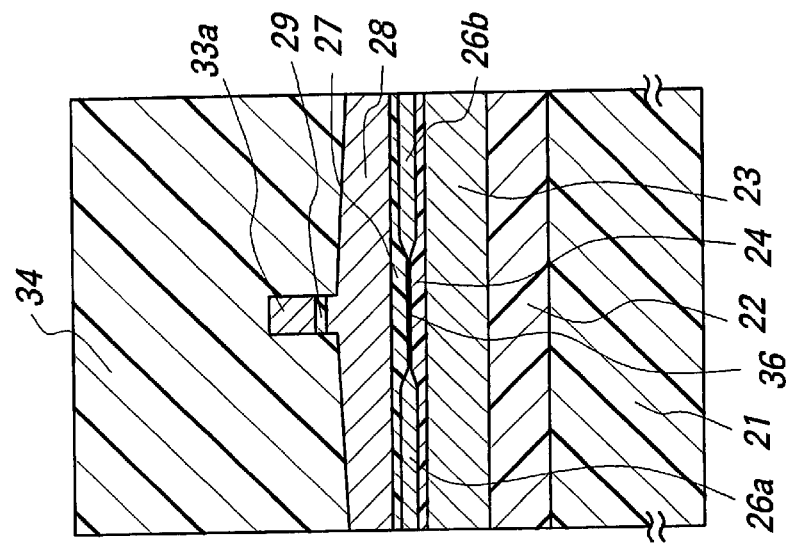
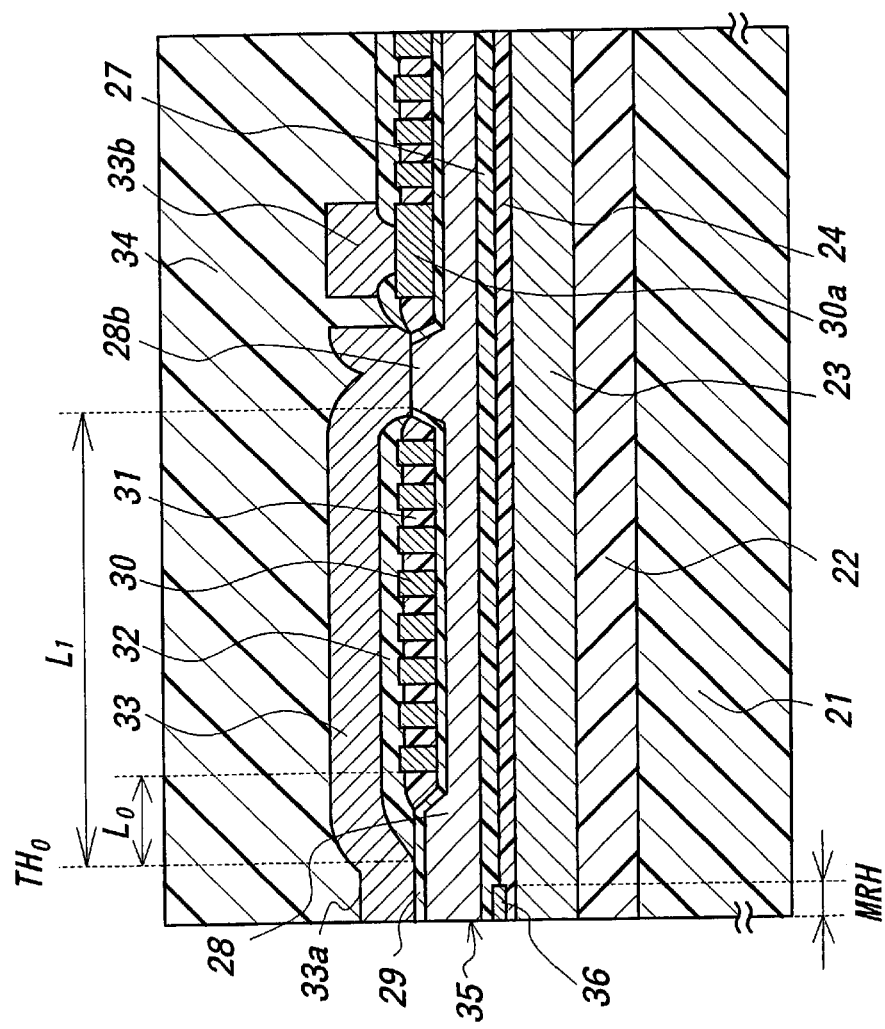

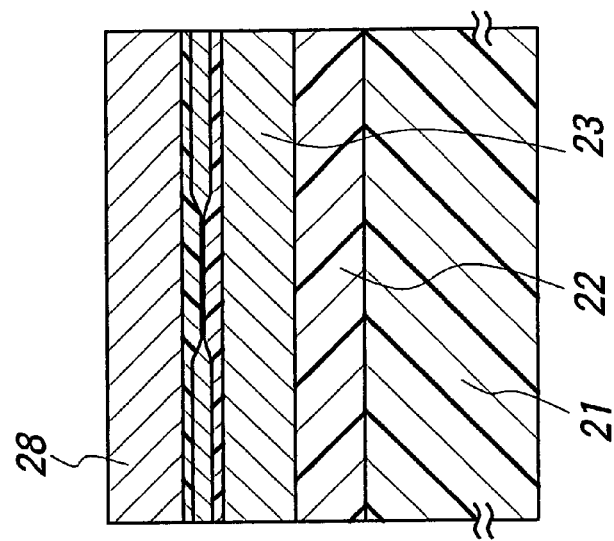
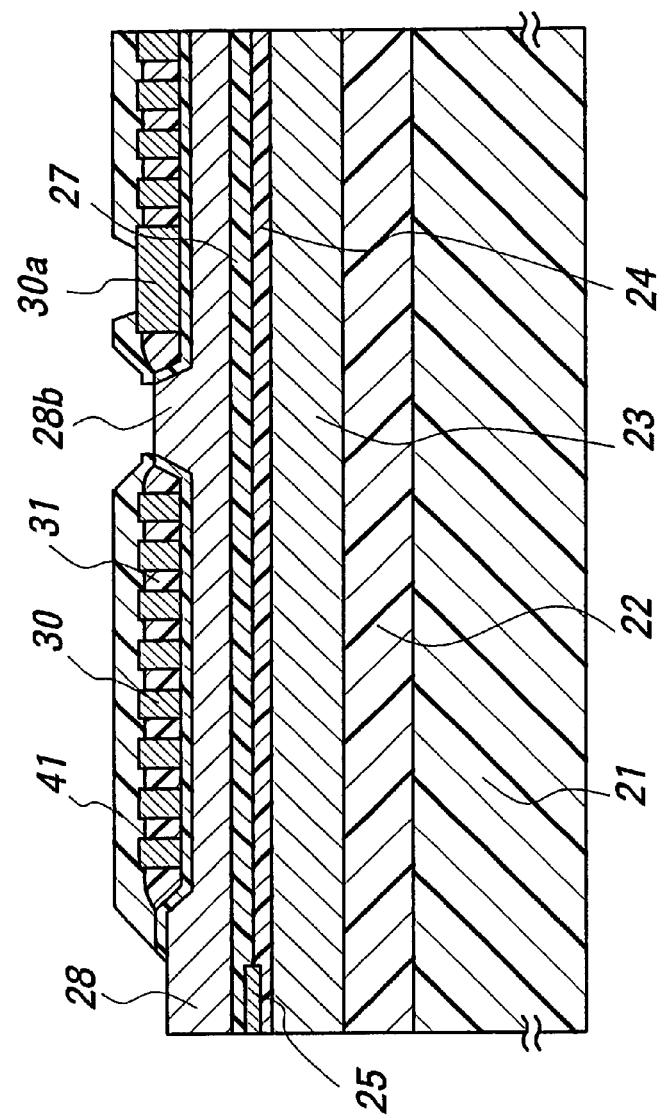
FIG. 18A
FIG. 18B

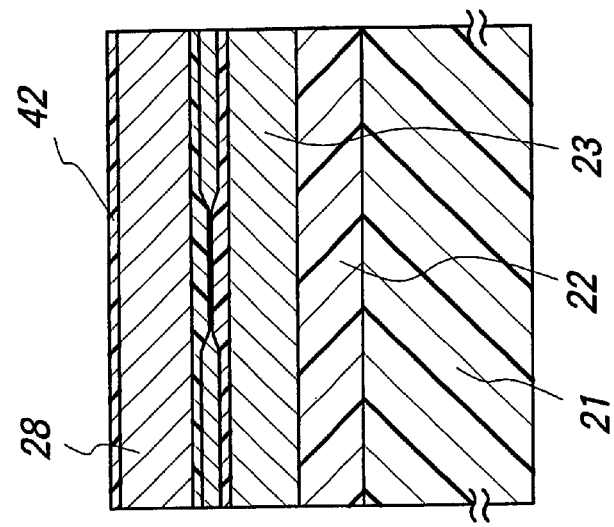
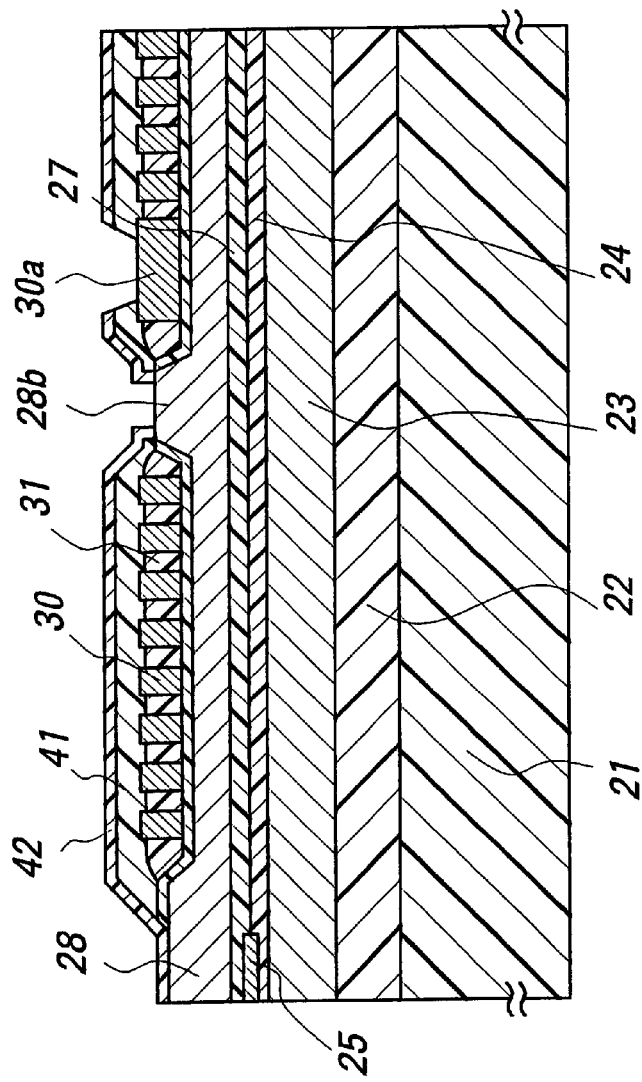

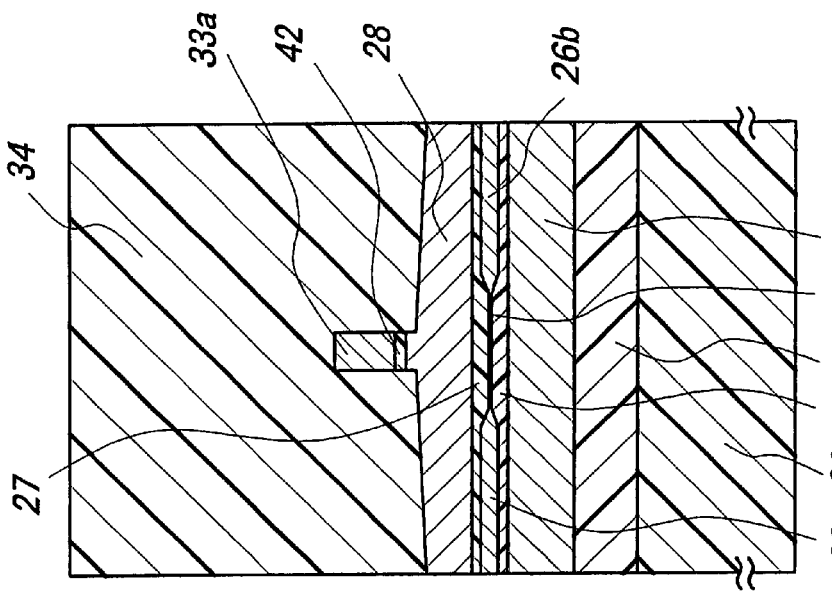
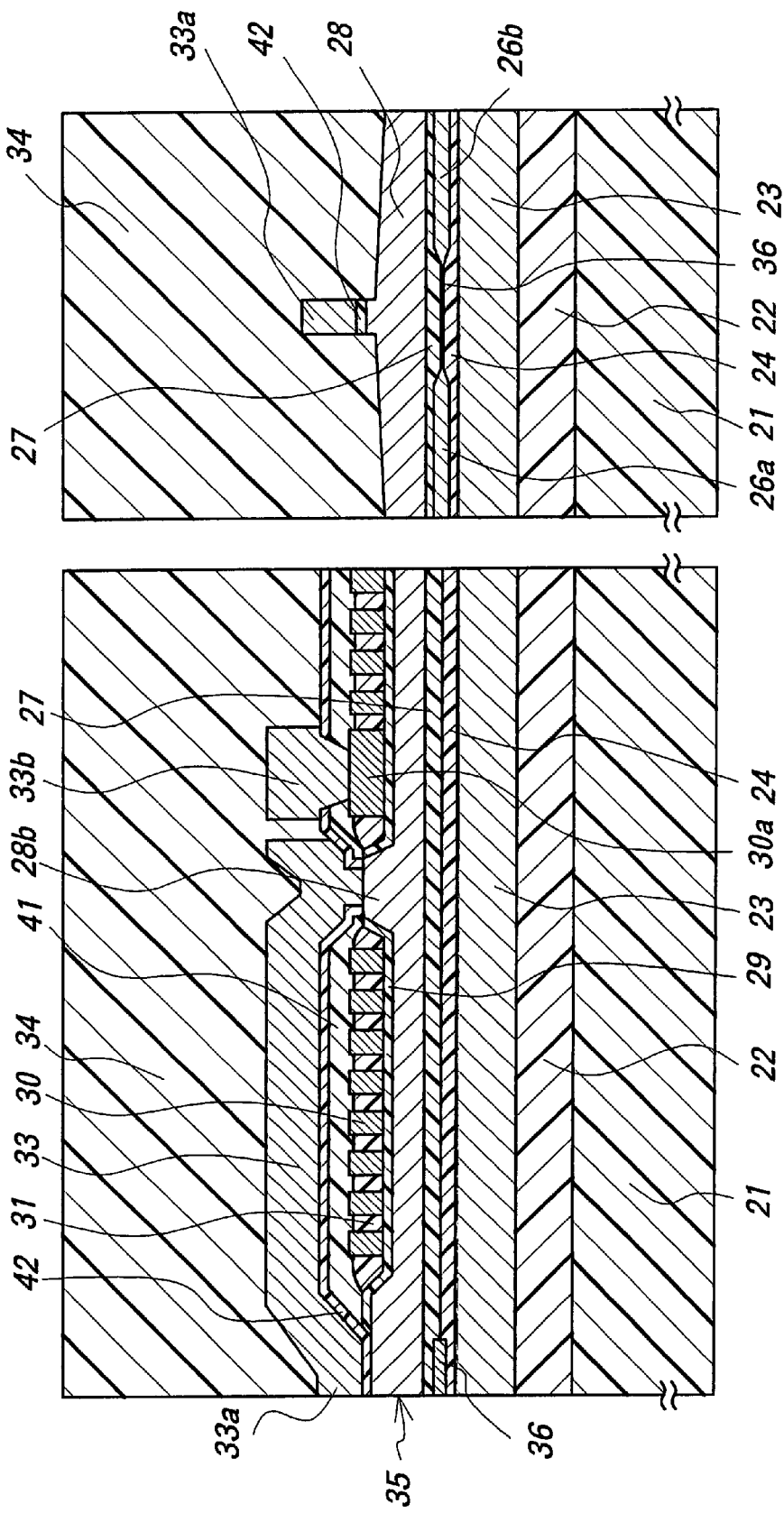

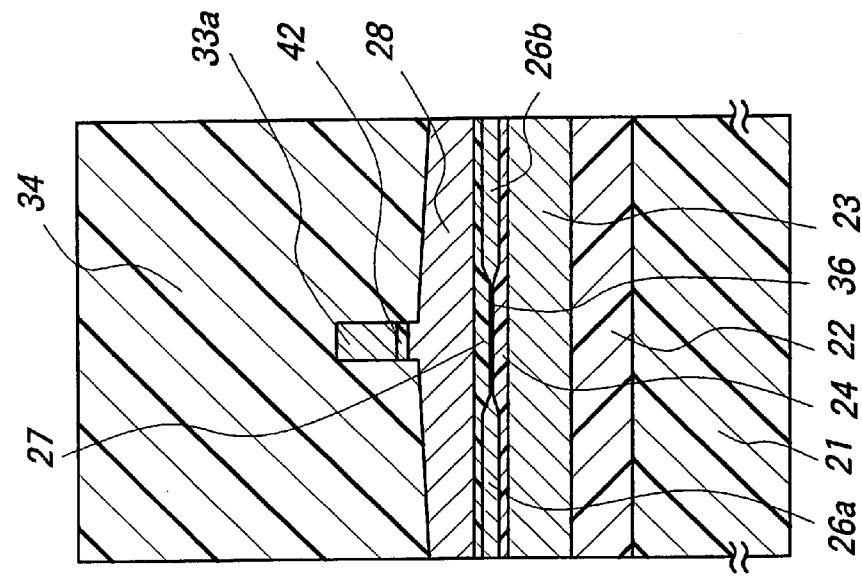
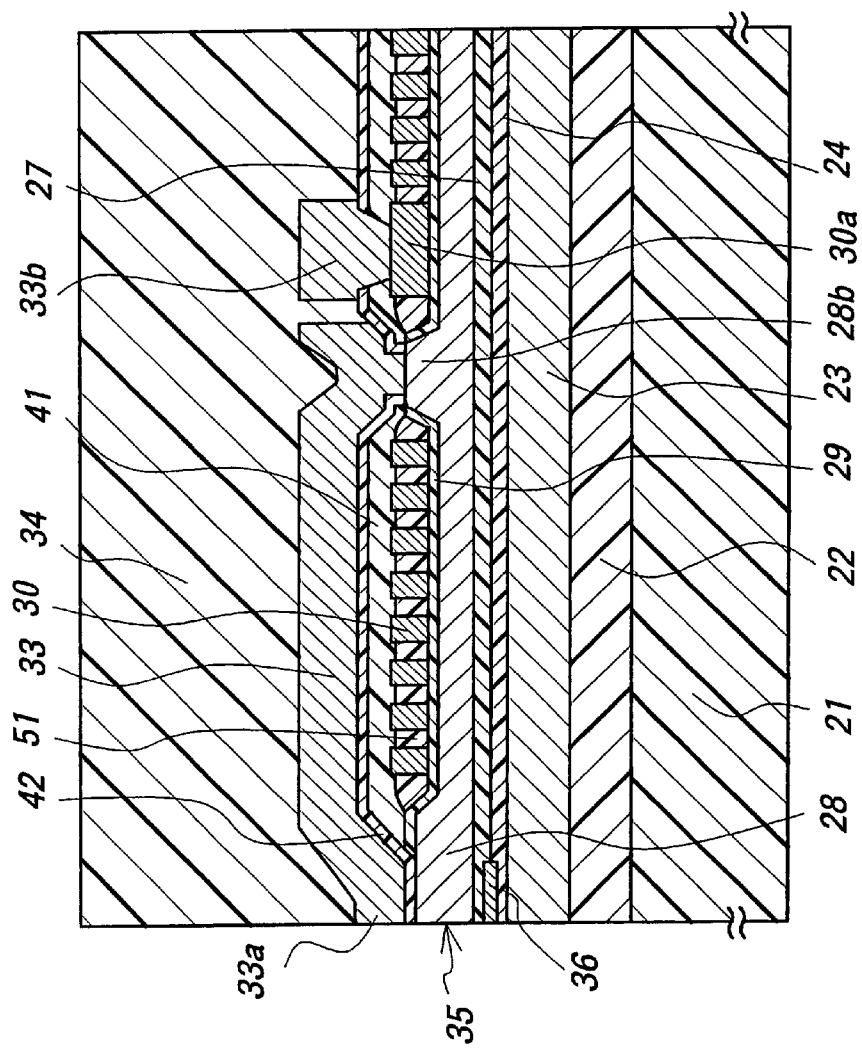

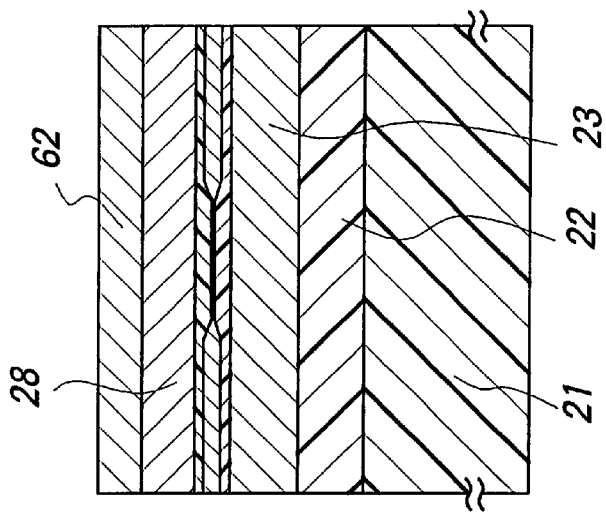
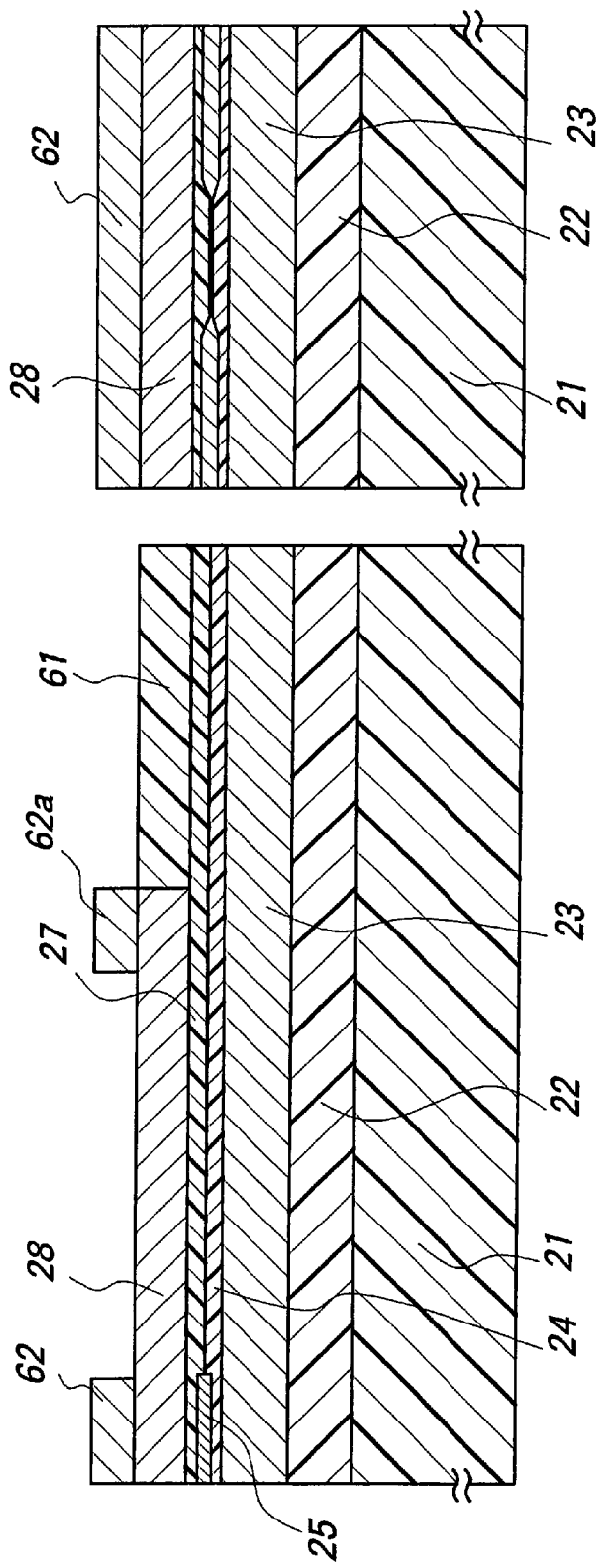

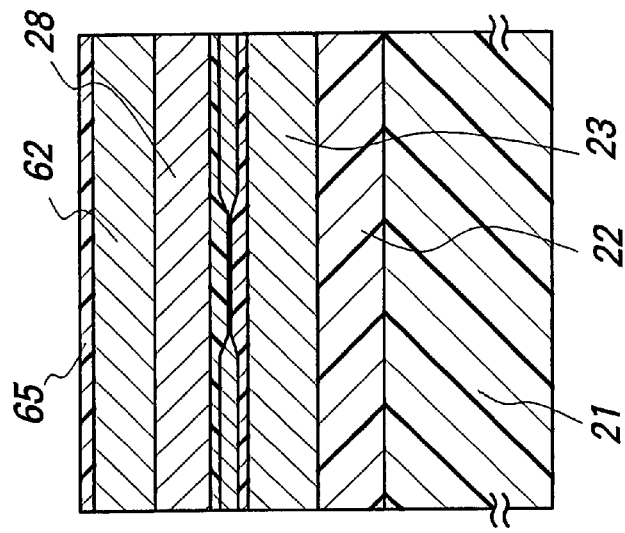
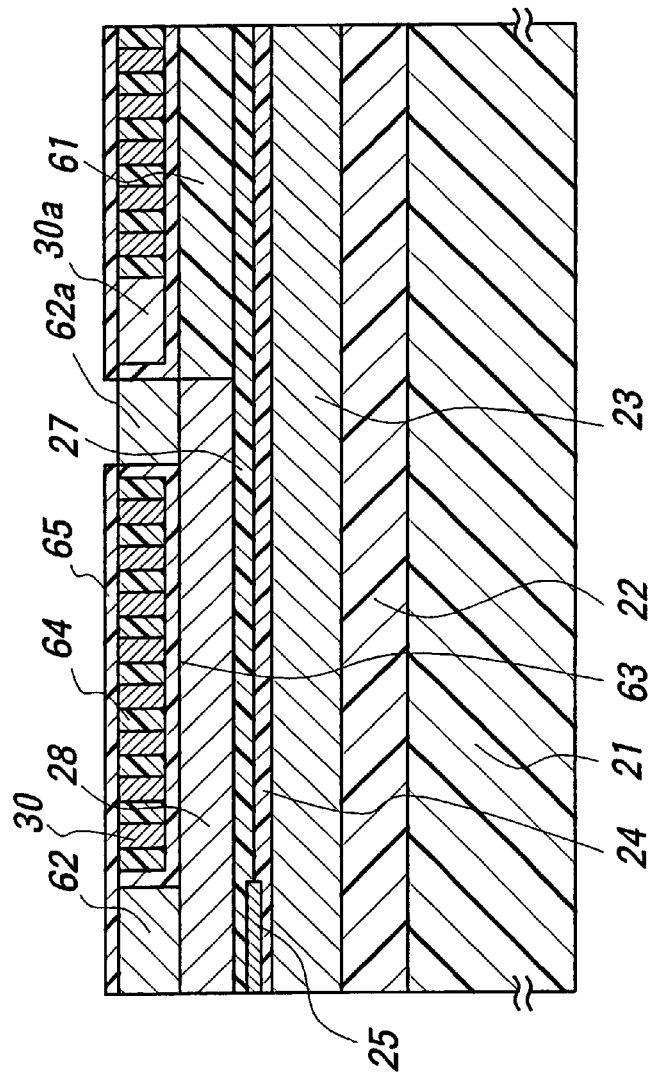

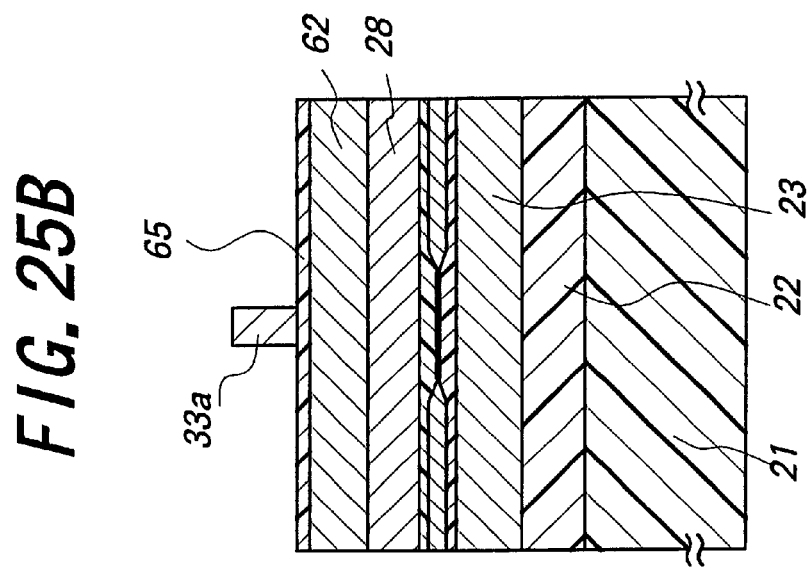
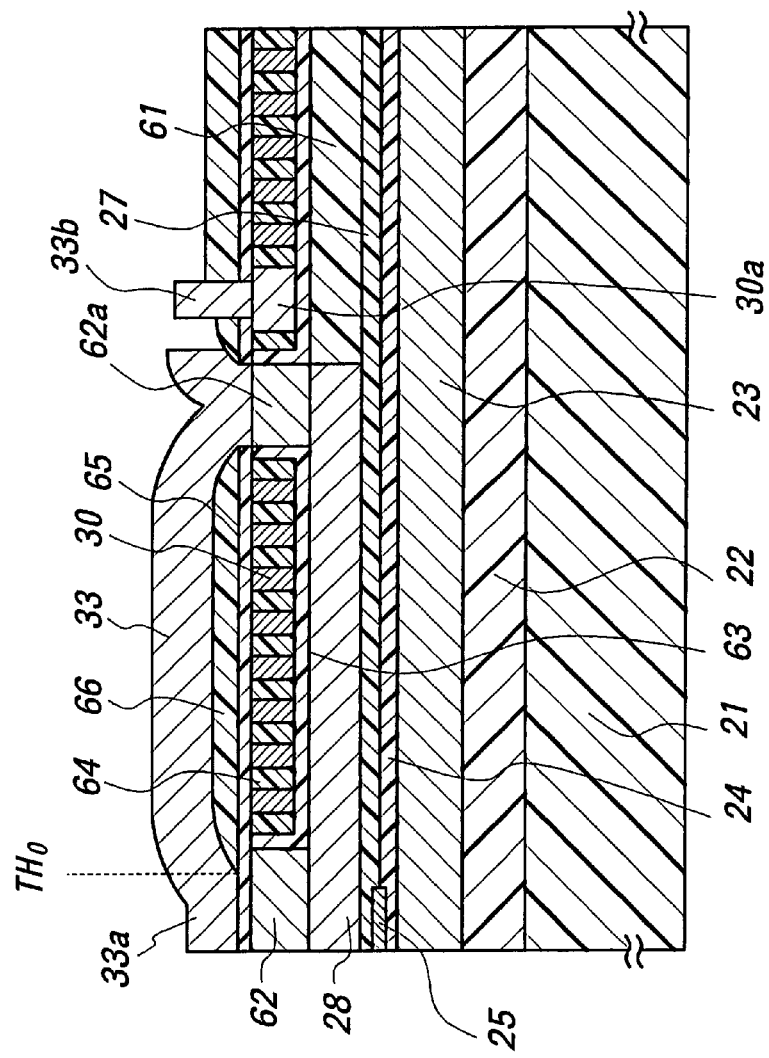

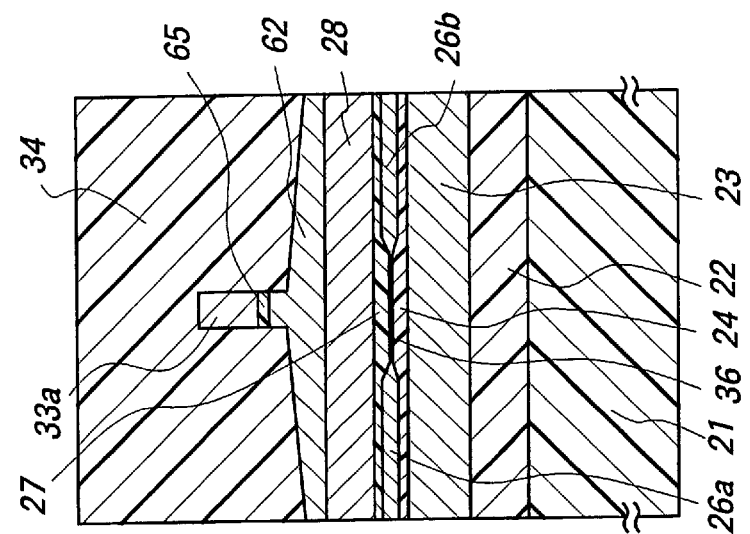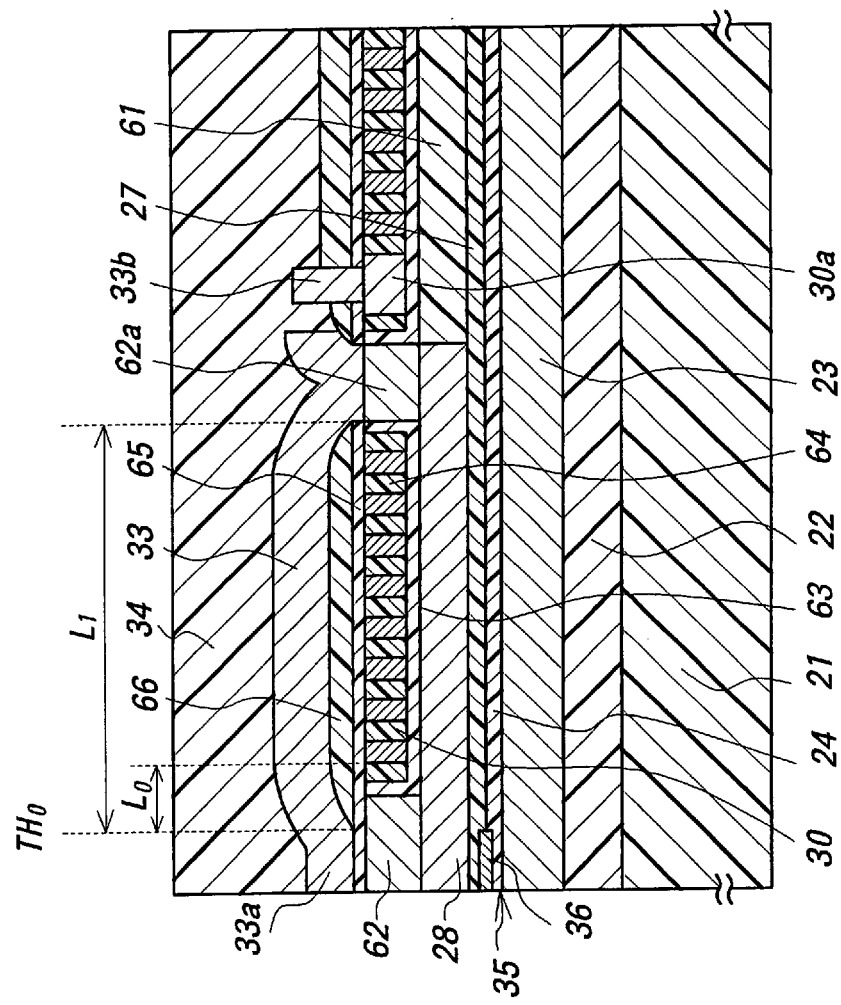

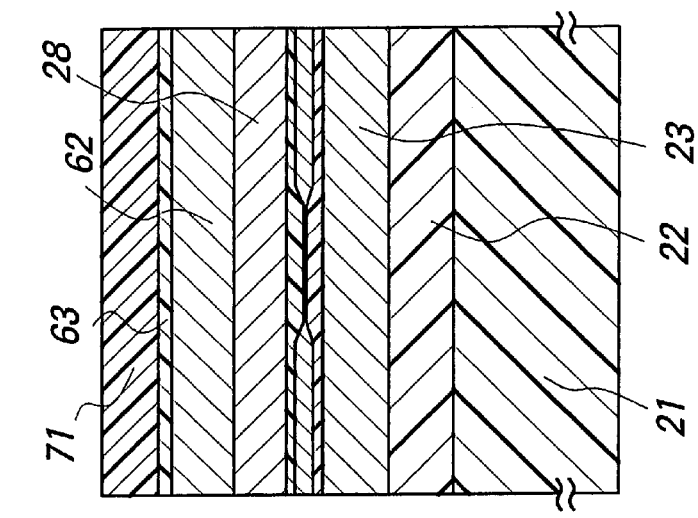
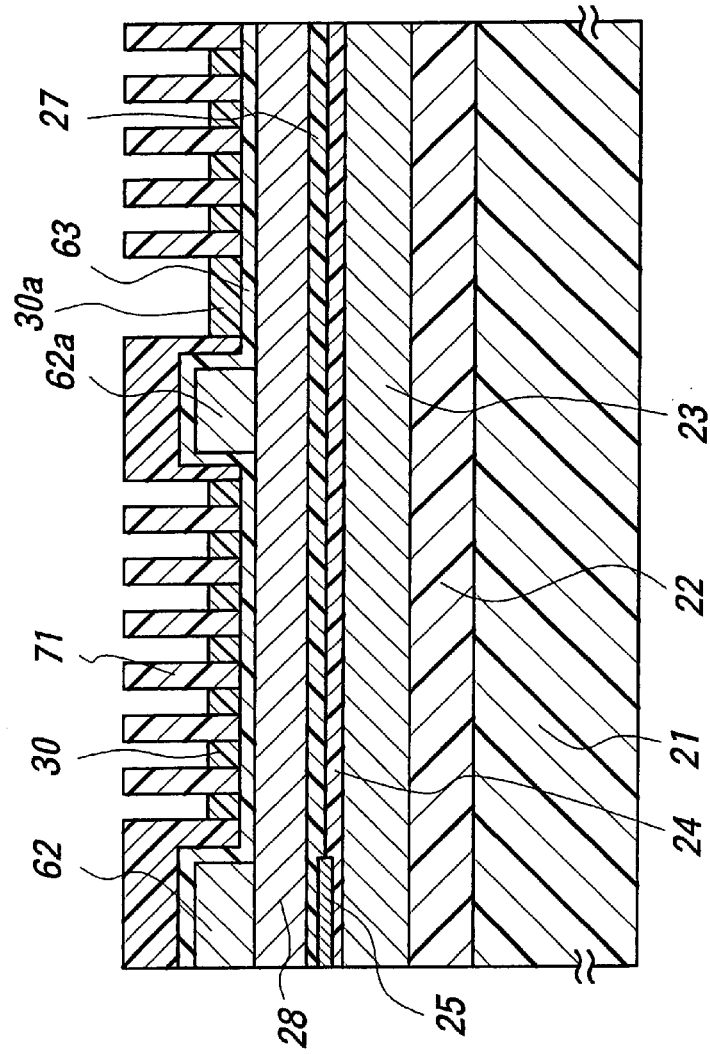

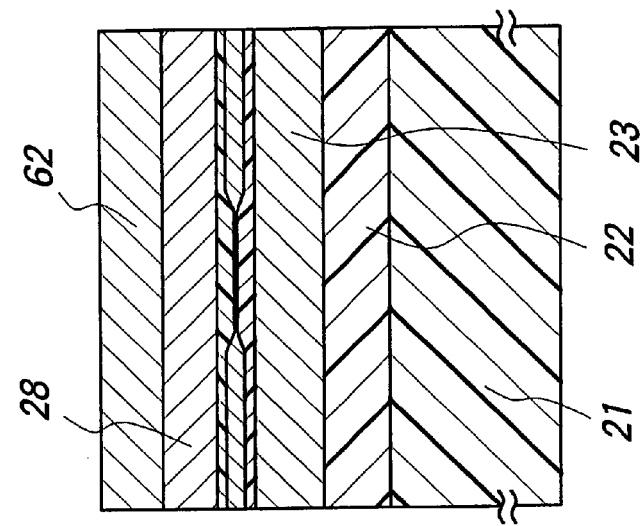
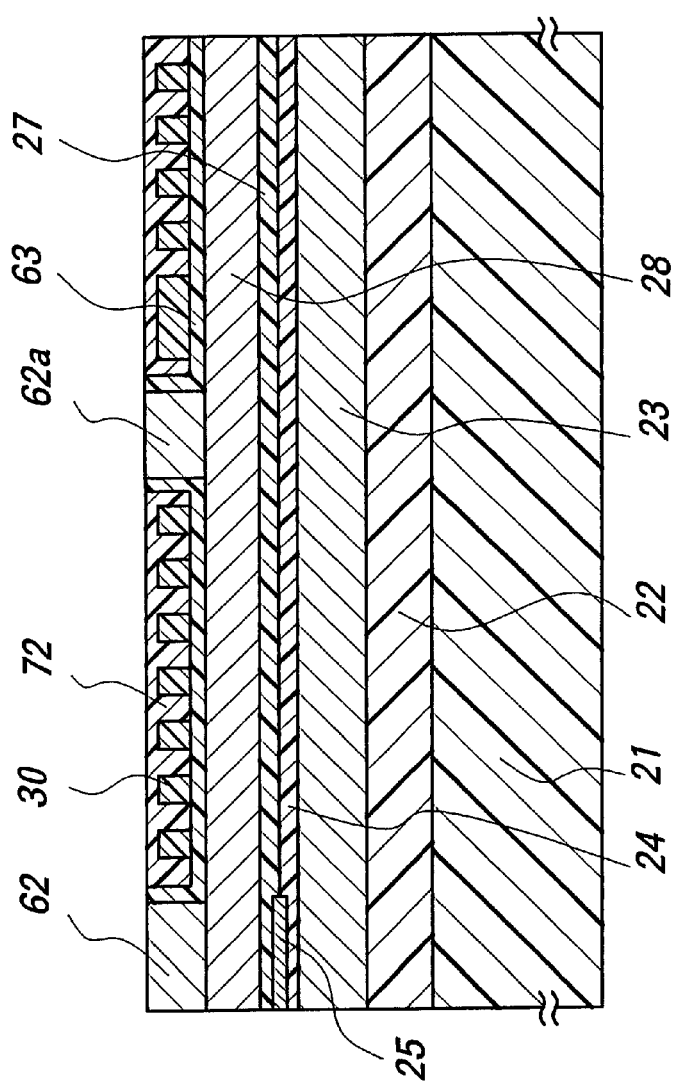

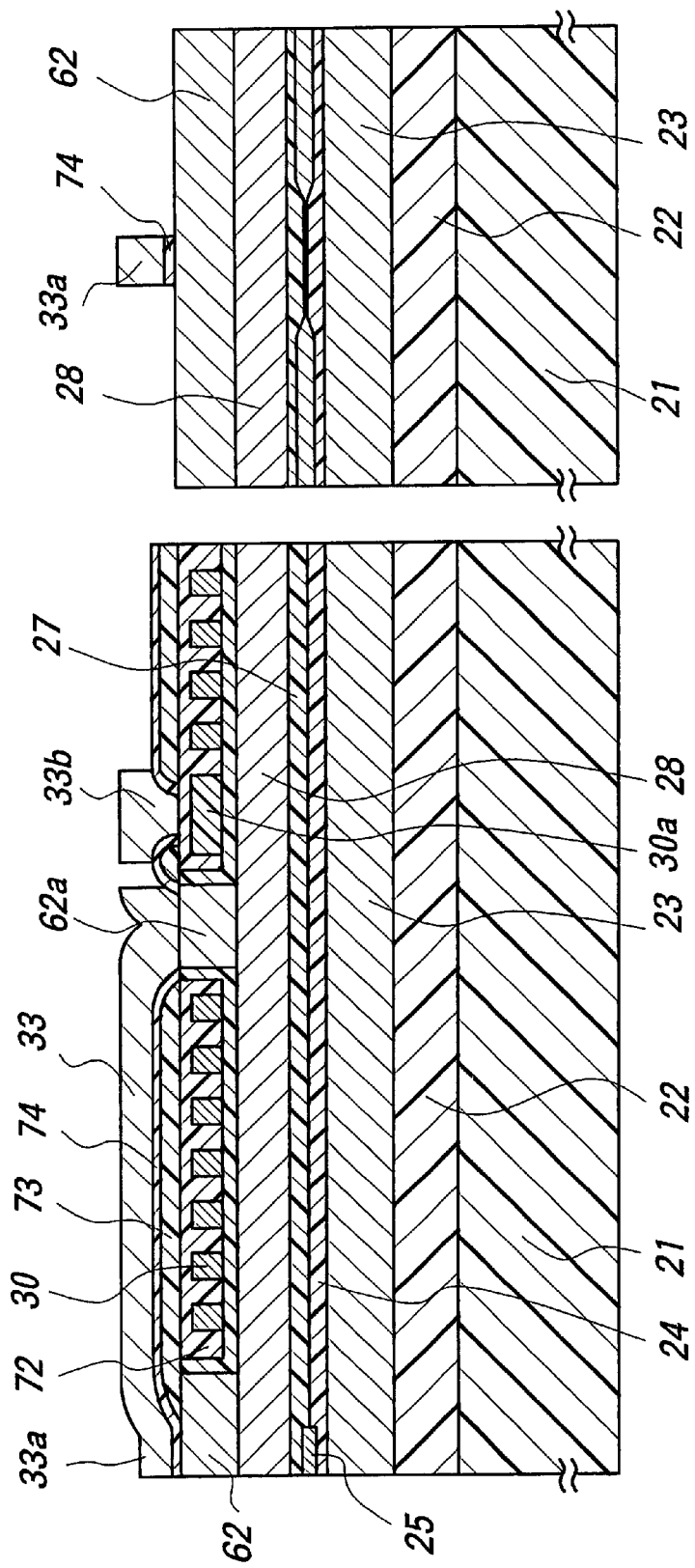

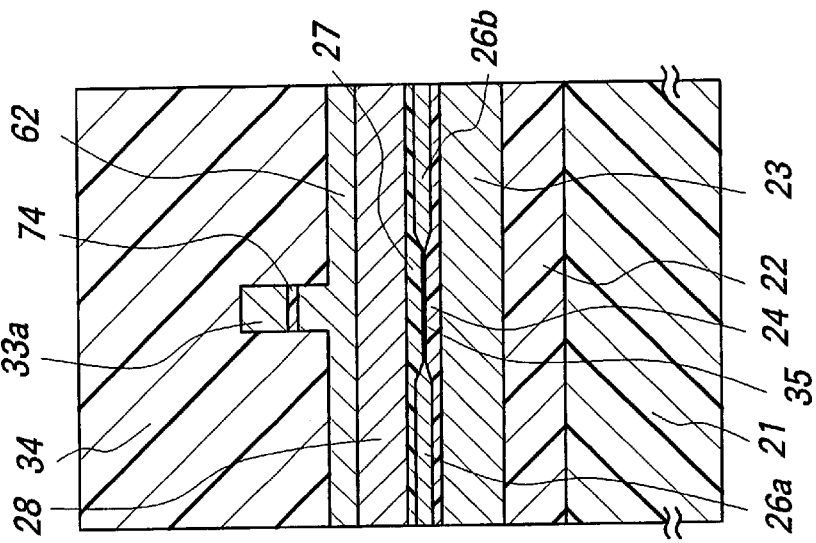
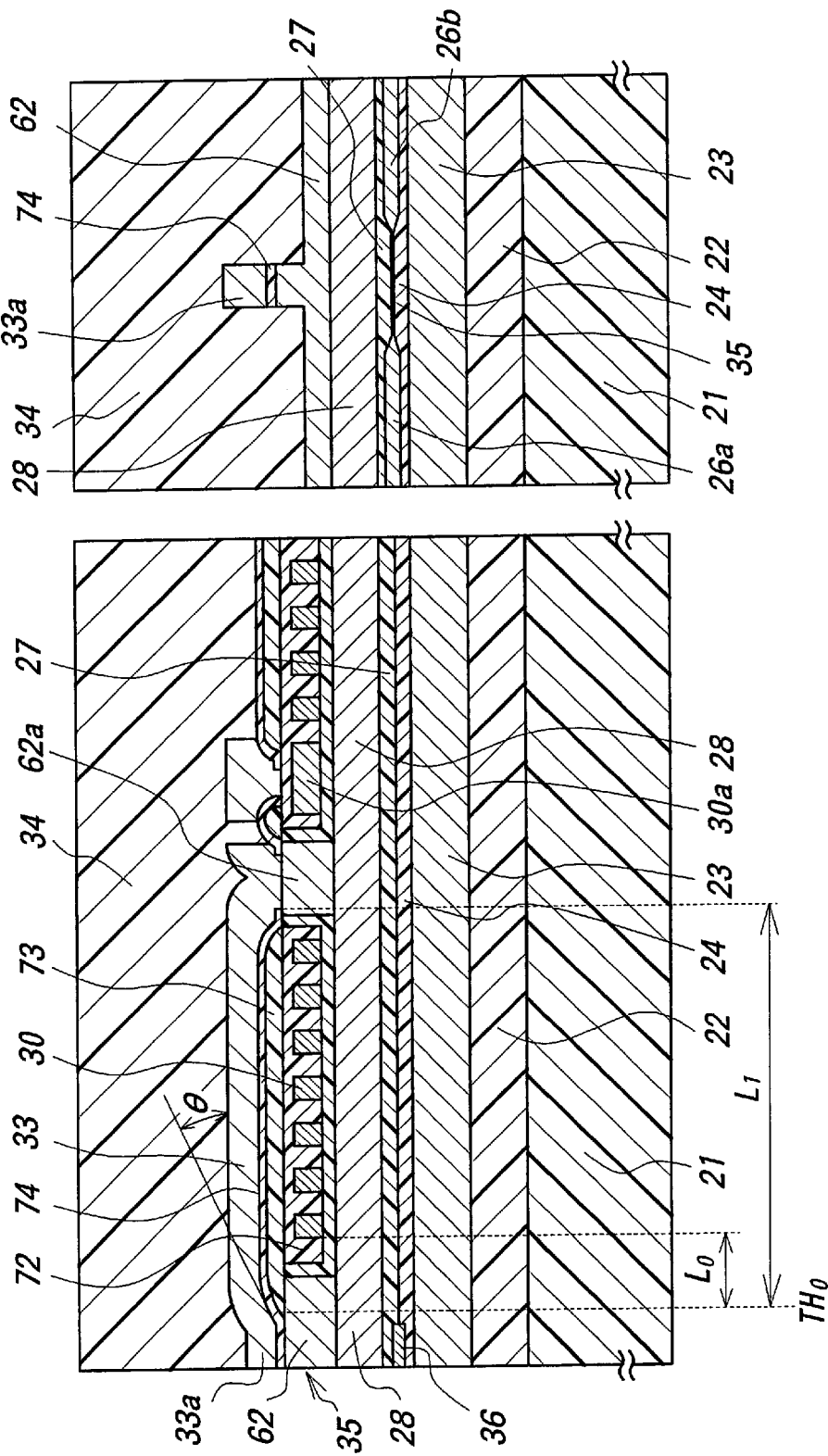

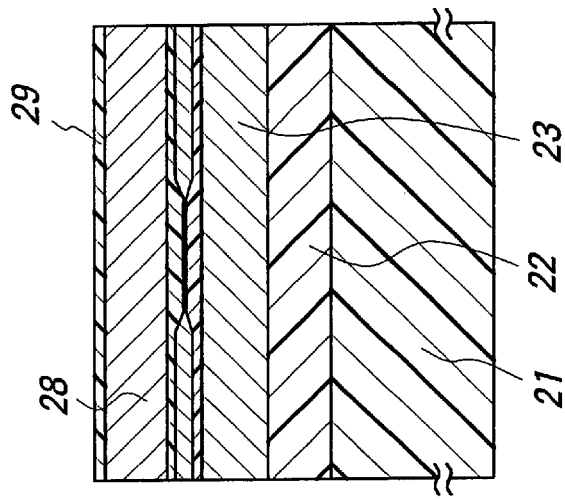
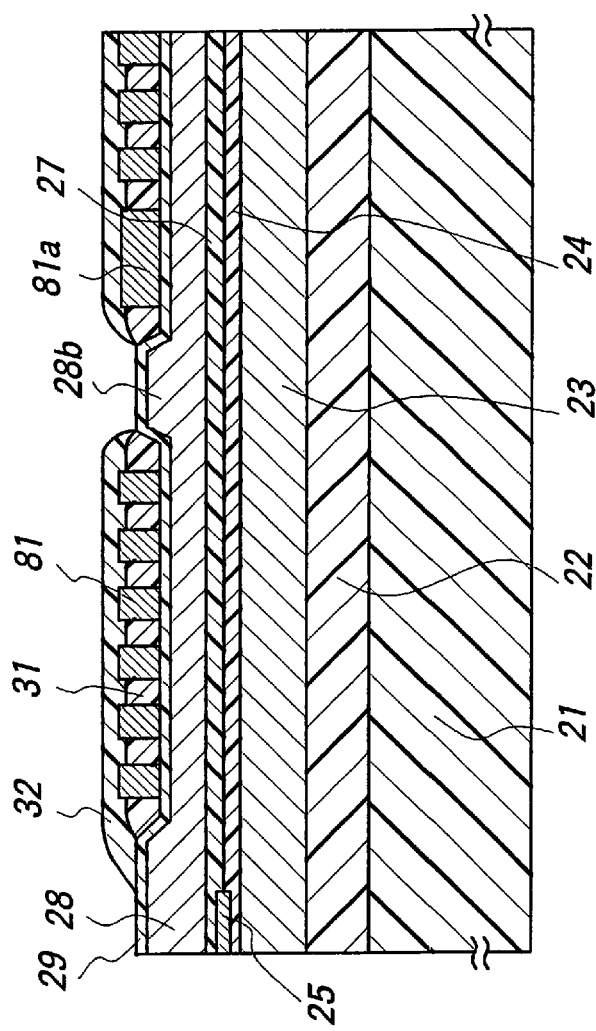

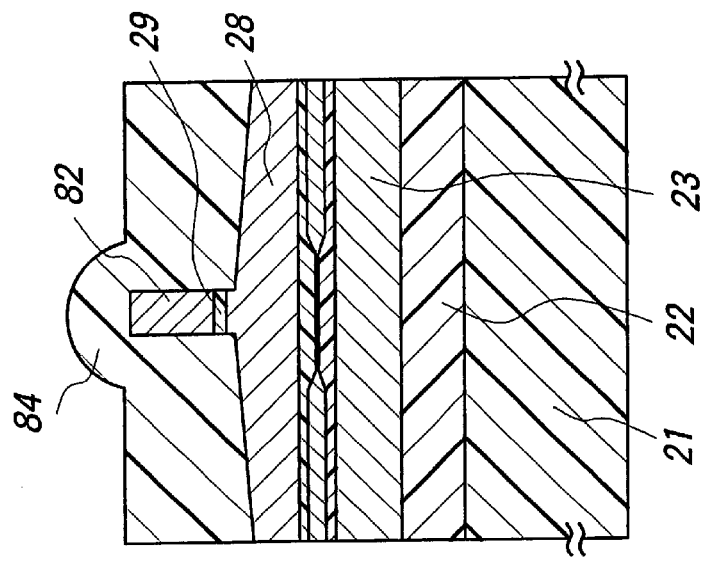
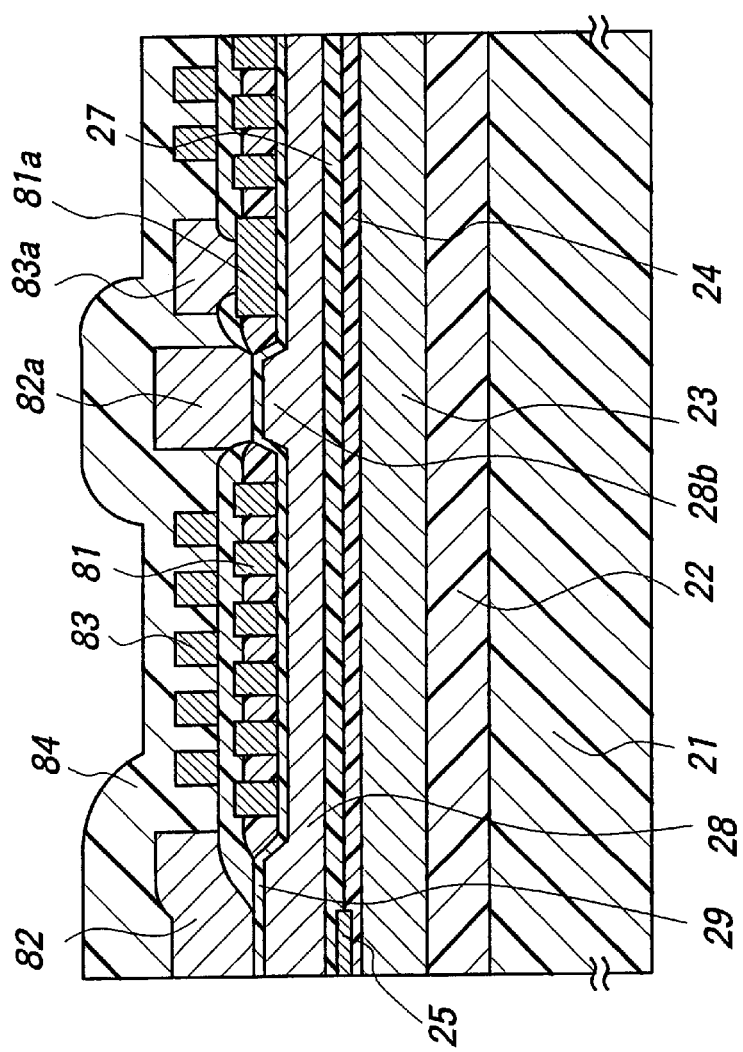

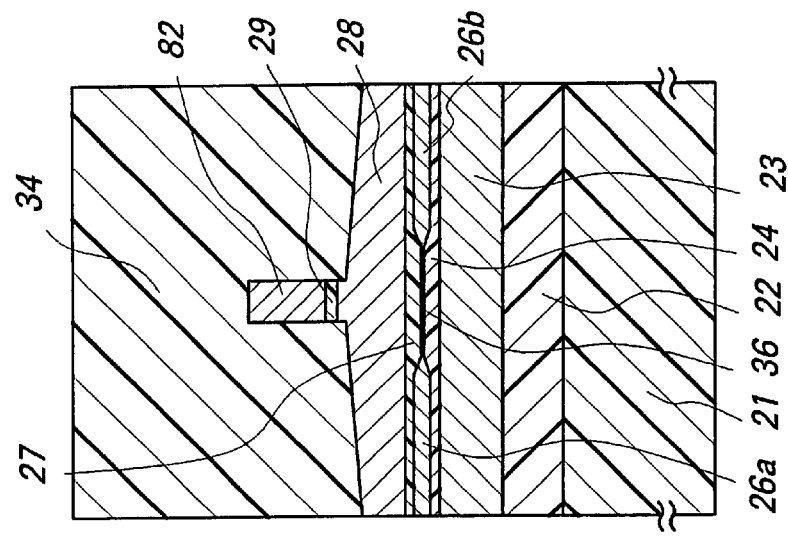
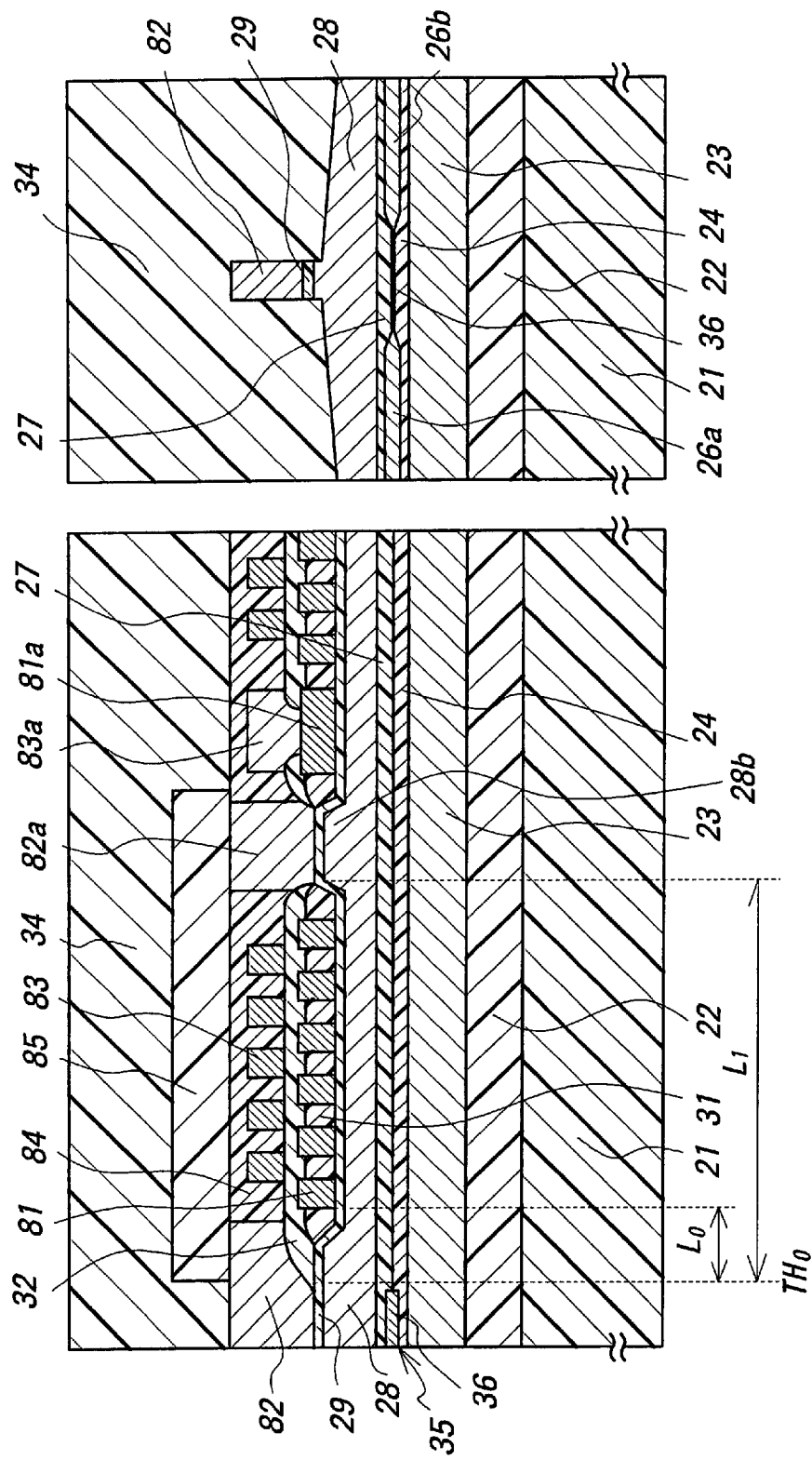

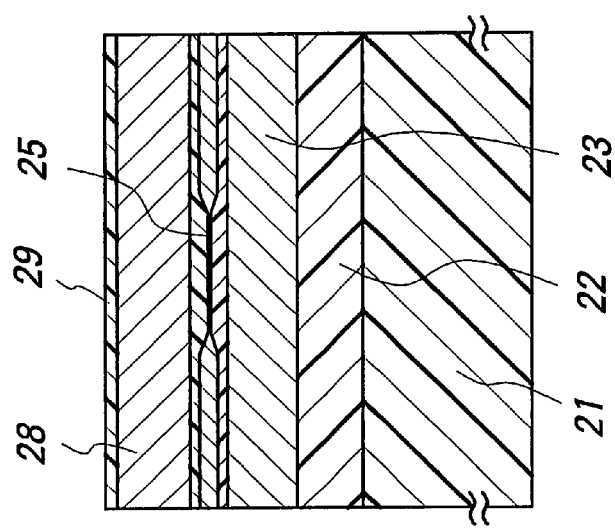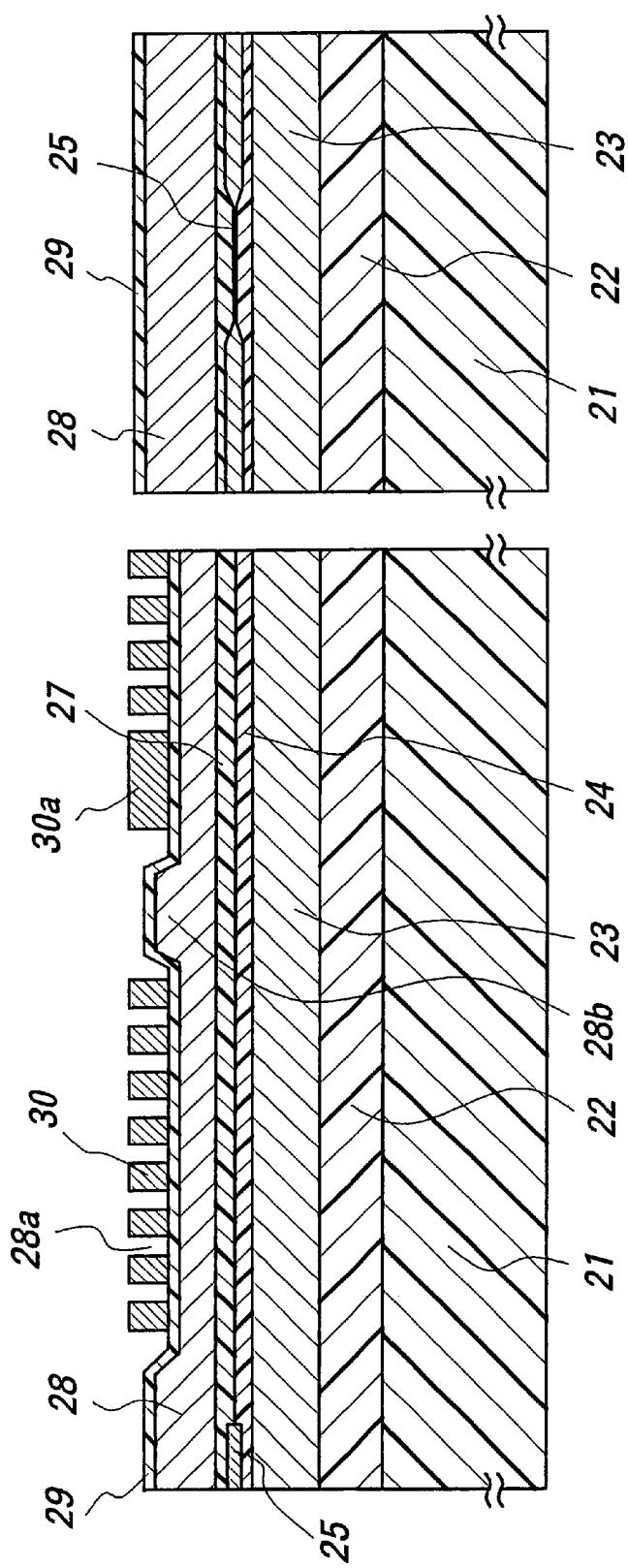

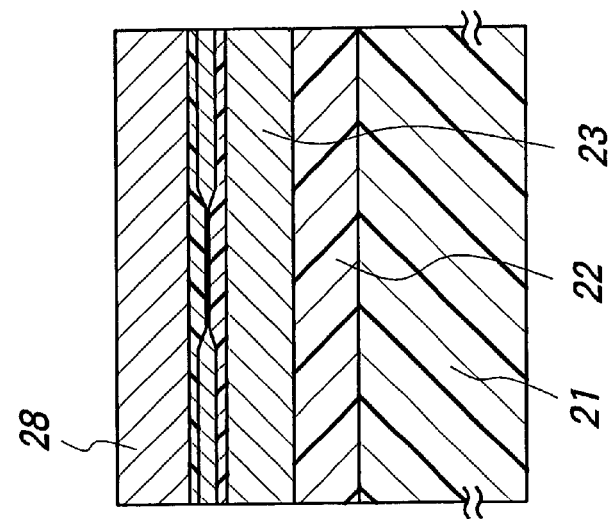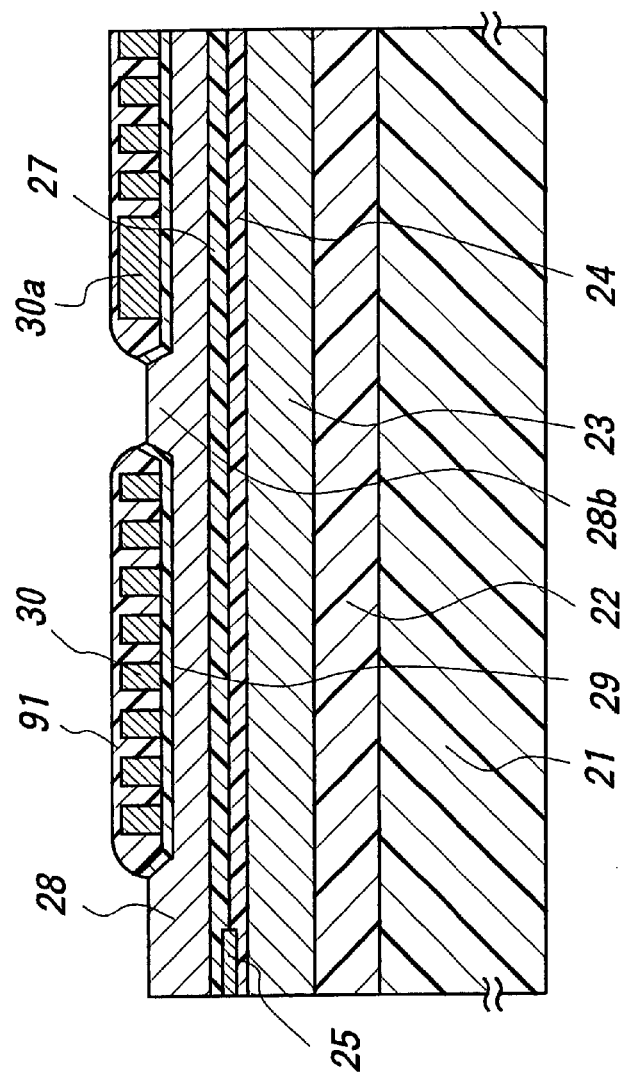

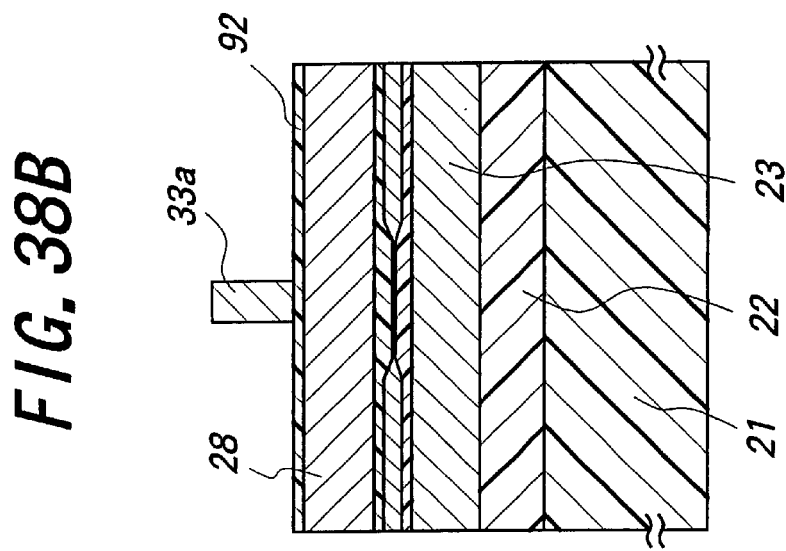
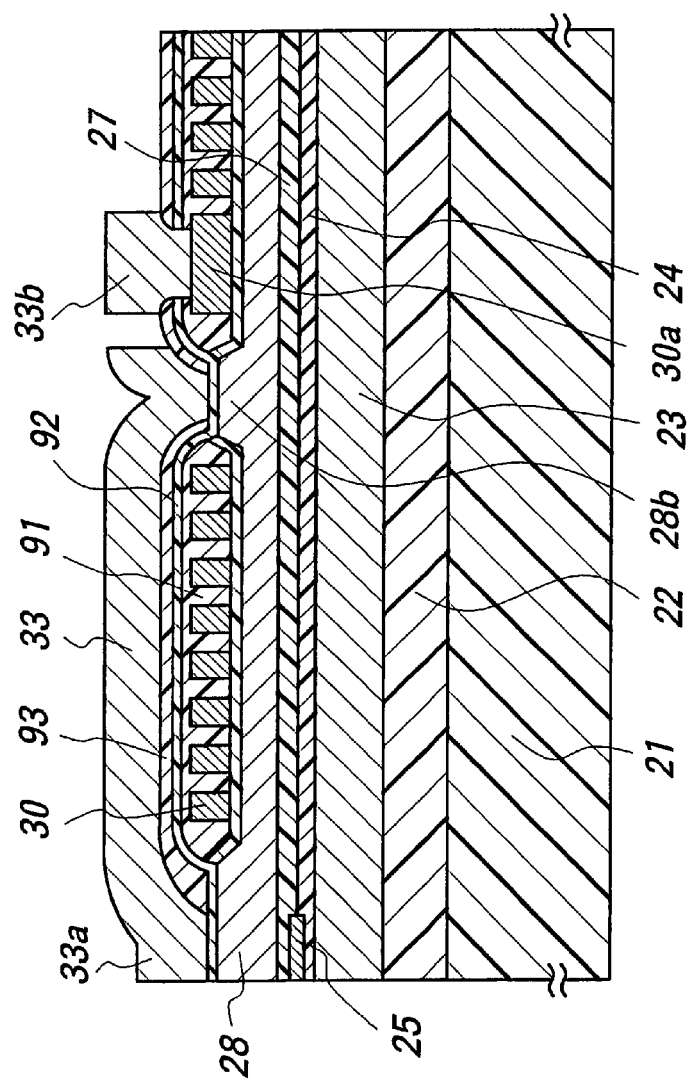
FIG. 38A
FIG. 38B

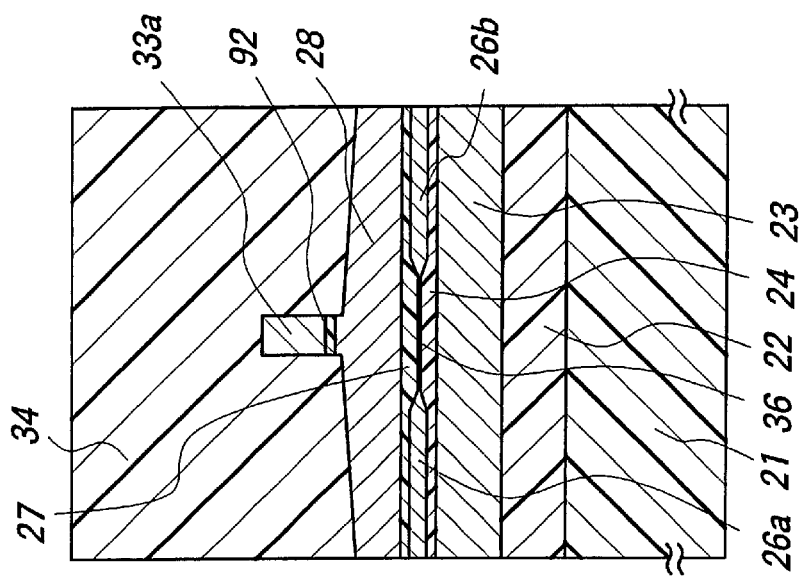
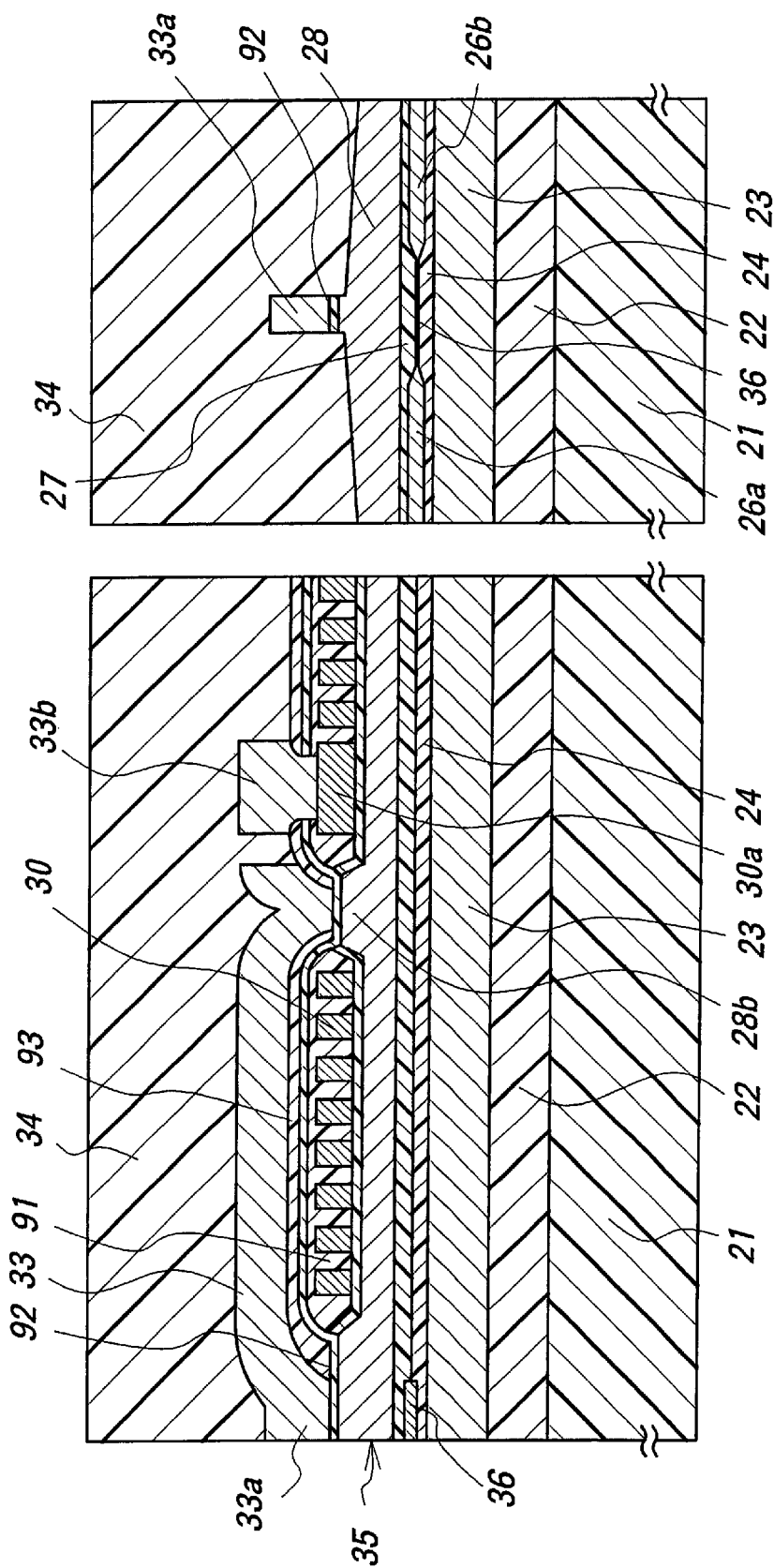

THIN FILM MAGNETIC HEAD HAVING A WRITE GAP LAYER

BACKGROUND OF THE INVENTION

1. Field of the Invention

The present invention relates to a thin film magnetic head and a method of manufacturing the same, and more particularly relates to an inductive type writing thin film magnetic head and a method of manufacturing the same.

2. Description of the Related Art

Recently a surface recording density of a hard disc device has been improved, and it has been required to develop a thin film magnetic head having an improved performance accordingly. A combination type thin film magnetic head is constructed by stacking an inductive type thin film magnetic head intended for writing and a magnetoresistive type thin film magnetic head intended for reading on a substrate, and has been practically used. In general, as a reading magnetoresistive element, an element utilizing anisotropic magnetoresistive (AMR) effect has been used so far and a surface recording density of about one gigabits/inch$^2$ has been realized. In order to increase a surface record density, there has been further developed a reproducing element utilizing a giant magnetoresistive (GMR) effect having a resistance change ratio higher than that of the normal anisotropic magnetoresistive effect by several times, and a very high surface recording density of about three gigabits/inch$^2$ has been realized. By increasing a surface recording density in this manner, it is possible to realize a hard disc device which has a very large storage capacity not less more than ten gigabytes.

The reproducing thin film magnetic head including the above mentioned GMR element has a same structure as the reproducing thin film magnetic head having the AMR element, and the AMR element is merely replaced by the GMR element. It should be noted that in the GMR element, a reproduced output is higher than that of the AMR element by 3–5 times under a same external magnetic field. The GMR film has a multiple layer structure including several films. The film structure of the GMR changes depending upon a mechanism producing the GMR effect. There have been proposed the super-lattice GMT film, glanular film, and so on. The spin valve film will be predominant owing to its simple structure, a large resistance change under a weak magnetic field and a large scale manufacture.

As stated above, a surface recording density can be simply increased by changing the AMR element by the GMR element as long as the reproducing thin film magnetic head is concerned. A height of a magnetoresistive reproducing element, i.e. MR Height (MRH) is one of factors determining a performance of the reproducing head including a magnetoresistive reproducing element. The MR height MRH is a distance measured from an air bearing surface on which one edge of the magnetoresistive reproducing element is exposed to the other edge of the element remote from the air bearing surface. During a manufacturing process of the magnetic head, a desired MR height MRH can be obtained by controlling an amount of polishing the air bearing surface.

At the same time, the performance of the recording magnetic head is also required to be improved in accordance with the improvement of the performance of the reproducing magnetic head. In order to increase a surface recording density, it is necessary to make a track density on a magnetic record medium, a width of a write gap at the air bearing surface has to be reduced to a value within a range from several micron meters to several sub-micron meters. In order to satisfy such a requirement, the semiconductor manufacturing process has been adopted for manufacturing the thin film magnetic head.

One of factors determining the performance of the inductive type writing thin film magnetic head is a throat height (TH). This throat height TH is a distance of a pole portion measured from the air bearing surface to an edge of an insulating layer which serves to separate a thin film coil from the air bearing surface. It has been required to shorten this distance as small as possible. The reduction of this throat height is also decided by an amount of polishing the air bearing surface.

Therefore, in order to improve the performance of the combination type thin film magnetic head having the inductive type recording head and magnetoresistive reading head stacked one on the other, it is very important to make the performance of the recording head and the performance of the reading head to be balanced with each other.

FIGS. 1A–7B show successive steps of a known method of manufacturing a conventional standard thin film magnetic head. In these drawings, A represents a cross sectional view cut along a plane perpendicular to the air bearing surface and B denotes a cross sectional view of a pole portion cut along a plane parallel to the air bearing surface. FIGS. 10–12 are cross sectional and plan views showing a finally manufactured completed thin film magnetic head. It should be noted that the thin film magnetic head is of a combination type in which the inductive type writing thin film magnetic head and reproducing MR element are stacked one on the other.

First of all, as shown in FIGS. 1A–B, an alumina ($Al_2O_3$) insulating layer 2 having a thickness of about 5 $\mu$m is deposited on a substance 1 made of, for instance AlTiC. Next, a first magnetic layer 3 constituting a bottom shield which protects the MR reproduction element of the reproducing head from the influence of an external magnetic field, is formed with a thickness of about 3 $\mu$m.

Then, as shown in FIGS. 2A–B, after depositing an alumina insulating layer 4 of thickness 100–150 nm by sputtering, a magnetoresistive layer 5 made of a material having the magnetoresistive effect and constituting the MR reproduction element is formed with a thickness not larger than ten nano meters, and is then shaped into a given pattern by the highly precise mask alignment. Then, lead electrodes 6a, 6b are formed. Next, an alumina insulating layer 7 constituting a top shield gap layer is formed with a thickness of 100–150 nm by sputtering such that the GMR layer 5 is embedded within the insulating layers 4, 7. Furthermore, a second magnetic layer 8 made of a permalloy is formed with a thickness of about 3 $\mu$m. This second magnetic layer 8 has not only the function of the upper shield layer which magnetically shields the MR reproduction element together with the above described first magnetic layer 3, but also has the function of one of poles of the writing thin film magnetic head.

Then, as illustrated in FIGS. 3A–B, on the second magnetic layer 8, is formed a write gap layer 9 made of a non-magnetic material such as alumina and having a thickness of about 200 nm. Then, a photoresist layer 10 having a large thickness of 1.0–1.5 $\mu$m is formed by the electroplating, and a thin film coil 11 is formed by electroplating with a thickness of 1.5–2.0 $\mu$m as shown in FIGS. 4A–B. After that, as shown in FIGS. 5A–B, a photoresist insulating layer 12 is formed such that the thin film coil 11 is supported thereby in an electrically isolated manner.

During this process, a reference position $TH_0$ of throat height zero is determined by a pattern edge of the insulating layer 12. Further, an apex angle θ is determined by a height of the thin film coil 11 and a configuration of a side wall of the insulating layers 10, 12. The apex angle θ can be reduced to 25–35° by increasing a distance from the reference position $TH_0$ of throat height zero to the outermost edge of the thin film coil 12. By reducing the apex angle θ, the pole portion of the writing thin film magnetic head can be formed precisely by photolithography and a width of the write track determined by a width of the pole portion can be shortened.

Next, as depicted in FIG. 6, a third magnetic layer 13 made of a magnetic material having a high saturation magnetic flux density such as a permalloy (Ni:50 wt %, Fe:50 wt %) and an iron nitride (FeN) is deposited with a thickness of about 3 μm. In this manner, a top pole is formed. During this process, the second magnetic layer 8 and third magnetic layer 13 are coupled with each other at a position remote from the pole portion to constitute a back gap.

Furthermore, as depicted in FIGS. 7–B, in order to avoid a spread of an effective write track width, i.e. in order to prevent a magnetic flux from being spread at a pole during the data recording, a part of the write gap layer 9 surrounding the pole chip 13a of the third magnetic layer 13 as well as the second magnetic layer 8 are etched by means of an ion beam etching such as an ion milling to form the trim structure. After that, an overcoat layer 14 made of alumina is deposited. Finally, a side on which the GMR layer 5 and write gap layer 9 are formed is polished to form an air bearing surface (ABS) 15, while the reference position of throat height zero $TH_0$ is used as a positional reference. During the formation of the air bearing surface 15, the GMR layer 5 is also polished to form a MR reproducing element 16. In this manner, the desired throat height TH and the MR height MRH are obtained.

FIGS. 8A–C is a plan view showing the known thin film magnetic head manufactured in the manner explained above, in this figure the overcoat layer 14 is removed and the third magnetic layer 13 and lead member LD for connecting the innermost coil winding of the thin film coil 11 to an external circuit are shown by imaginary lines, and further contours of the insulating layers 10, 12 are denoted by a solid line. FIG. 8B is a cross sectional view showing its part, and FIG. 8C is a cross sectional view illustrating the back gap portion on an enlarged scale.

Upon manufacturing the known thin film magnetic head, there is a particular problem in the precise formation of the top pole on a protrusion of the thin film coil covered with the insulating photoresist layer 12 along an inclined surface (Apex) thereof after forming the thin film coil 11. In the known manufacturing method, upon forming the third magnetic layer 13, after forming a magnetic material layer such as a permalloy on the protrusion of the thin film coil having a height of 4–6 μm by plating, a photoresist layer is formed thereon with a thickness of 4–5 μm and then the photoresist layer is shaped into a desired pattern by means of the photolithography. Here the photoresist layer formed on the protrusion of the thin film coil should have a thickness of at least 3 μm, at a bottom portion of the inclined portion, a thickness of the photoresist layer becomes about 7–8 μm.

The third magnetic layer 13 formed on the protrusion of the thin film coil having a height of about 7–8 μm as well as on the flat write gap layer has to be patterned such that the pole portion of the third magnetic layer near the edge of the photoresist insulating layers 7, 12 should have a narrow width, because a track width is determined by the width of the pole portion. For instance, in order to obtain a track width of, for instance 0.5 μm, a pattern width of the photoresist layer having a thickness of 7–8 μm should be 0.5 μm.

However, such a fine patterning for forming the pattern having a width of about 0.5 μm in the thick photoresist layer having a thickness of 7–8 μm is very difficult. Upon exposure in the photolithography, the pattern might be deformed due to the reflection of light and the resolution might be decreased due to a large thickness of the photoresist layer. In this manner, it is particularly difficult to perform the precise patterning for the top pole which should be narrowed for realizing the narrow record track. Particularly, when the third magnetic layer 13 is formed by the electroplating, a seed layer made of a permalloy is formed by the sputtering, and therefore the pattern is liable to be deformed by the reflection from the seed layer.

The above mentioned influence of the reflection during the photolithography is also dependent upon the apex angle θ. If the apex angle θ is large, an amount of reflected light is increased and the deformation of the pattern becomes large. In order to reduce the apex angle θ, a length of the pole portion 13a of the third magnetic layer 13, i.e. a distance $L_0$ from the throat height zero reference position $TH_0$ to the outer edge of the thin film coil 11 is made large such as 10 μm as proposed in the above mentioned Japanese Patent Application Laid-open Publication Kokai Hei 8-87717. However, when the distance $L_0$ from the throat height zero reference position $TH_0$ to the outer edge of the thin film coil 11 is made large, a magnetic path length $L_1$ defined by a distance between the throat height zero reference position $TH_0$ to the inner edge of the insulating layers 19, 12 is prolonged. This results in that NLTS (Non-Linear Transition Shift) and high frequency property of the inductive type thin film magnetic head become worse. Furthermore, when the distance $L_0$ from the throat height zero reference position $TH_0$ to the outer edge of the thin film coil 11 is long, a magnetic flux induced by the thin film coil 11 is transmitted to the pole portion 13a only with a low efficiency, and a recording property is deteriorated.

In order to shorten the above mentioned distance $L_0$, a pitch of coil windings of the thin film coil 11 is made as small as possible, but since the distance $L_0$ from the throat height zero reference position $TH_0$ to the outer edge of the thin film coil 11 has to be long for reducing the apex angle θ as explained above, the magnetic path length $L_1$ could not be shortened.

Moreover, when the thin film coil 11 is formed by the electroplating, it is necessary to provide a step in which successive coil windings are separated from each other by removing a seed layer by the ion beam etching. In this case, in order to reduce the magnetic path length $L_1$, when a part of the thin film coil 11 is formed at an inclined portion of the insulating layer 7, there is formed a shade by a coil winding during the ion beam etching and the seed layer could not be removed sufficiently. Therefore, the thin film coil 11 has to be formed on the flat surface of the insulating layer 7, and thus there is a limitation in a reduction of the magnetic path length $L_1$.

As shown in FIG. 8C, in order to form the innermost coil winding of the thin film coil 11 precisely, a distance $L_2$ between the innermost edge of the thin film coil and the back gap portion should have about 5 μm. Therefore, the magnetic path length $L_1$ could not be shortened sufficiently owing to the fact that the distance $L_0$ from the throat height zero reference position to the outermost edge of the thin film coil 11 becomes very long.

Furthermore, there has been proposed a thin film magnetic head, in which the magnetic path length $L_1$ is shortened by constructing the thin film coil to have a double layer structure. However, in this case, a photoresist insulating layer supporting first and second layer thin film coil halves becomes higher. Then, in order to reduce the apex angle θ by decreasing an inclination angle of the side wall of the insulating layer, the distance $L_0$ from the throat height zero reference position to the outermost edge of the thin film coil 11 might become very long, and thus the reduction in the magnetic path length $L_1$ has a limitation.

SUMMERY OF THE INVENTION

The present invention has for its object to provide a thin film magnetic head, in which the above mentioned various problems of the conventional thin film magnetic head can be solved or mitigated, while even if the apex angle θ is decreased such that the fine structure of the pole portion can be manufactured precisely, the distance $L_0$ from the throat height zero reference position $TH_0$ to the outer edge of the thin film coil can be shortened to improve the recording efficiency, and the magnetic path length $L_1$ can be reduced to improve the NLTS property and high frequency property.

It is another object of the invention to provide a method of manufacturing the above mentioned thin film magnetic head having the above mentioned superior properties accurately and efficiently with a high yield.

According to the invention, a thin film magnetic head comprises:

a substrate;

a first magnetic member supported by said substrate and having a recess formed in a surface thereof, said surface being opposite to a surface on which the first magnetic member is supported by the substrate, and said recess being formed at an inner position than a throat height zero reference position;

a thin film coil a part of which is provided in said recess which is formed in the surface opposite to the surface on which the first magnetic member is supported by the substrate, said thin film coil including a plurality of coil windings;

an insulating member supporting said plurality of coil windings of the thin film coil and extending externally beyond said recess, an outer edge of the insulating member defining said throat height zero reference position;

a second magnetic member formed on a surface of said insulating member remote from the substrate and including a pole portion extending up to an air bearing surface beyond said insulating member, a width of said pole portion defining a write track width; and a write gap layer provided at least between said first magnetic member and said second magnetic member.

In the thin film magnetic head according to the invention, said at least a part of a plurality of coil windings of the thin film coil is embedded in the recess of the first magnetic member, and the insulating member supporting the coil windings of the thin film coil in an electrically insulating manner is extended beyond the periphery of the recess up to the throat height zero reference position. Therefore, a distance $L_0$ from the throat height zero reference position to the outer periphery of the thin film coil can be shortened without increasing an apex angle θ, and thus a fine structure of the pole portion of the second magnetic member can be formed precisely to realize a write track width of sub-micron order and the outer periphery of the thin film coil can be closer to the air bearing surface to improve the recording efficiency. Moreover, a magnetic path length $L_1$ defined by a distance from the throat height zero reference position to the inner edge of the insulating member supporting the coil windings of the thin film coil in an electrically insulating manner can be also shortened, and thus the NLTS and high frequency properties can be improved.

In a preferable embodiment of the thin film magnetic head according to the invention, said first magnetic layer may be formed by forming the recess in a surface of a magnetic layer having a uniform thickness or may be formed by providing a lower pole chip on a magnetic layer having a uniform thickness at a side of the air bearing surface. Furthermore, the second magnetic member may be formed by an upper pole chip constituting a pole portion and an upper pole connected to the upper pole chip. In this case, it is preferable that a front end of the upper pole is retarded from the air bearing surface. Such a structure can prevent a side fringe due a leakage of a magnetic flux from the upper pole, and an increase in the write track width and influence to adjacent tracks can be avoided. Such effects are particularly important in a fine structure in which the write track width is sub-micron order.

The thin film coil may be a single layer structure or a double layer structure. In case of the double layer structure, an insulating layer supporting coil windings of a first layer thin film coil is formed such that its outer edge is extended up to the throat height zero reference position, and an insulating layer supporting a second layer thin film coil is formed such that it is not extended beyond the outer edge of the recess up to the air bearing surface.

Moreover, the write gap layer may be formed not only between the first magnetic member and the pole portion of the second magnetic member, but also between the first magnetic member and the insulating layer or between the insulating layer and the second magnetic layer.

According to the invention, a method of manufacturing a thin film magnetic head having at least an inductive type thin film magnetic head supported by a substrate comprises:

a step of forming a first magnetic member supported by said substrate and having a recess formed in a surface which is opposite to a surface on which the first magnetic member is supported by the substrate, said recess being formed at an inner position than a throat height zero reference position;

a step of forming a thin film coil such that a part of the thin film coil is provided in said recess which is formed in the surface opposite to the surface on which the first magnetic member is supported by the substrate;

a step of forming an insulating member supporting a plurality of coil windings of the thin film coil and extending externally beyond said recess, an outer edge of the insulating member defining said throat height zero reference position;

a step of forming a write gap layer before forming said thin film coil or after forming said insulating member such that at least a pole portion of said first magnetic member is covered with said write gap layer; and a step of forming a second magnetic member on a surface of said insulating member remote from the substrate such that said second magnetic member includes a pole portion extending up to an air bearing surface beyond said insulating member and having a width which defines a write track width.

In the manufacturing method according to the invention, it is preferable that after forming said thin film coil, a first magnetic layer supporting the coil windings is formed such that the thin film coil is completely covered with the first magnetic layer or a part of the thin film coil is exposed, and then a second magnetic layer is formed on the first magnetic layer such that an outer edge of the second magnetic layer defines the throat height zero reference position. By constructing the insulating member by the double-layer structure including the first insulating layer mainly supporting the thin film coil and the second magnetic layer mainly defining the throat height zero reference position, the first and second magnetic layers can be formed to have most suitable configurations, and thus the thin film magnetic head having a much more fine structure can be manufactured in a much easier manner.

BRIEF DESCRIPTION OF THE DRAWINGS

FIGS. 1A and 1B–7A and 7B are cross sectional views showing successive steps of a known method of manufacturing a known combination type thin film magnetic head;

FIGS. 9A and 9B–15A and 15B are cross sectional views illustrating successive steps of the method of manufacturing a first embodiment of the thin film magnetic head according to the invention;

FIGS. 17A and 17B–20A and 20B are cross sectional views depicting successive steps of the method of manufacturing a second embodiment of the thin film magnetic head according to the invention;

FIGS. 21A and 21B are cross sectional views representing a third embodiment of the thin film magnetic head according to the invention;

FIGS. 22A and 22B–26A and 26B are cross sectional views depicting successive steps of the method of manufacturing a fourth embodiment of the thin film magnetic head according to the invention;

FIGS. 27A and 27B–30A and 30B are cross sectional views illustrating successive steps of the method of manufacturing a fifth embodiment of the thin film magnetic head according to the invention;

FIGS. 31A and 31B–34A and 34B are cross sectional views showing successive steps of the method of manufacturing a sixth embodiment of the thin film magnetic head according to the invention;

FIGS. 35A and 35B–39A and 39B are cross sectional views representing successive steps of the method of manufacturing a seventh embodiment of the thin film magnetic head according to the invention;

DESCRIPTION OF THE PREFERRED EMBODIMENTS

Now successive steps of the method of manufacturing a first embodiment of the thin film magnetic head according to the invention will be explained with reference to FIGS. 9A–15B. In these drawings, A represents a cross sectional view cut along a plane perpendicular to the air bearing surface and B denotes a cross sectional view of the pole portion cut along a plane parallel with the air bearing surface. In the present embodiment, the thin film magnetic head is constructed as a combination type thin film magnetic head, in which a magnetoresistive type reading thin film magnetic head is formed on a substrate and then an inductive type writing thin film magnetic head is stacked on the magnetoresistive type thin film magnetic head.

Figure 1B:
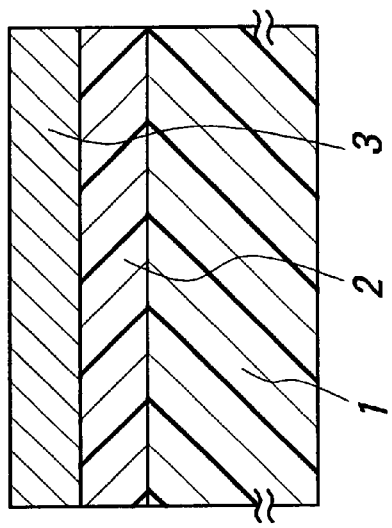
Figure 1A:
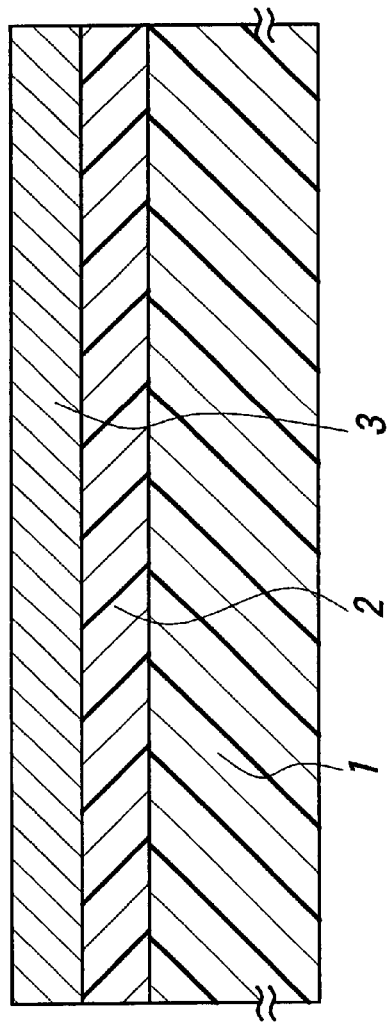
Figures 3A, 3B:
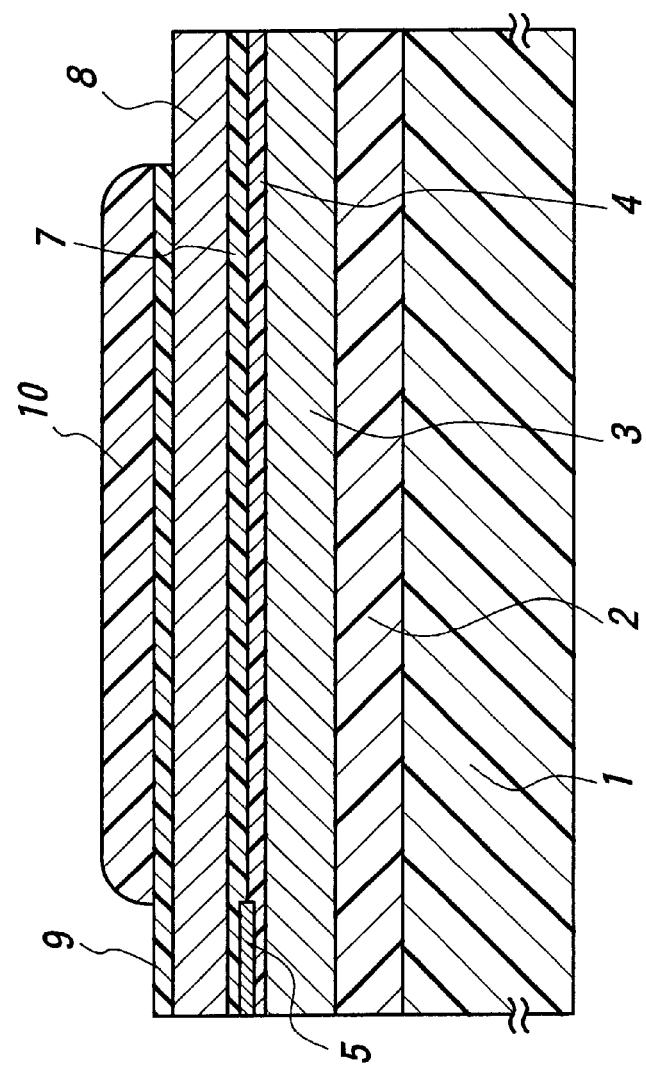
Figure 5A:
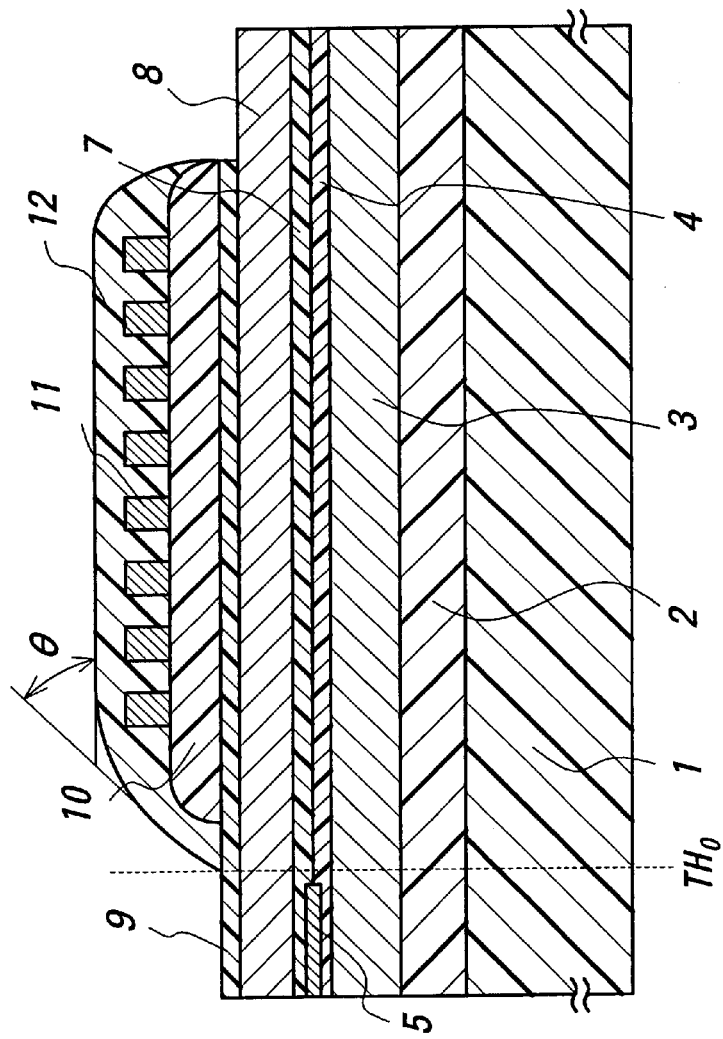
Figure 5B:
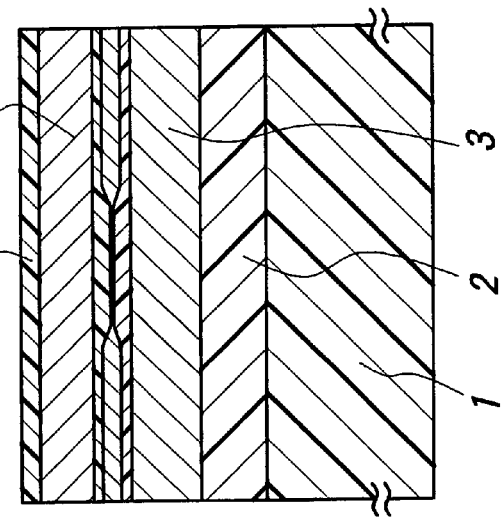
Figure 6A:
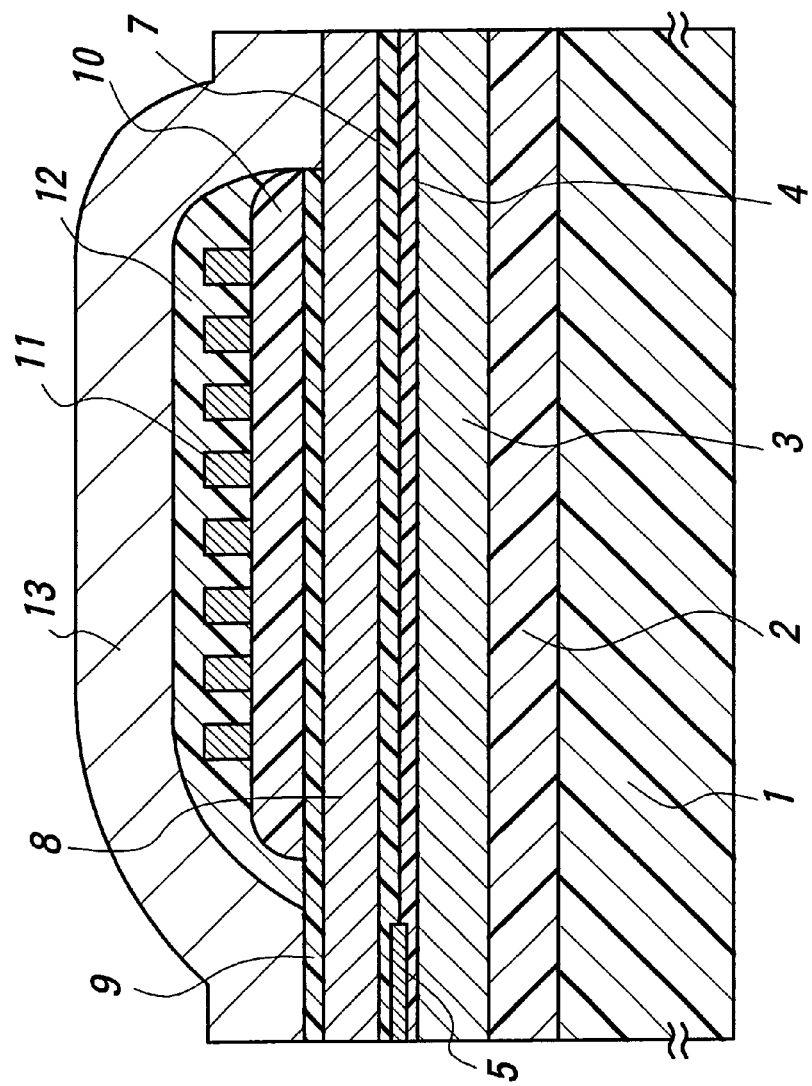
Figure 6B:
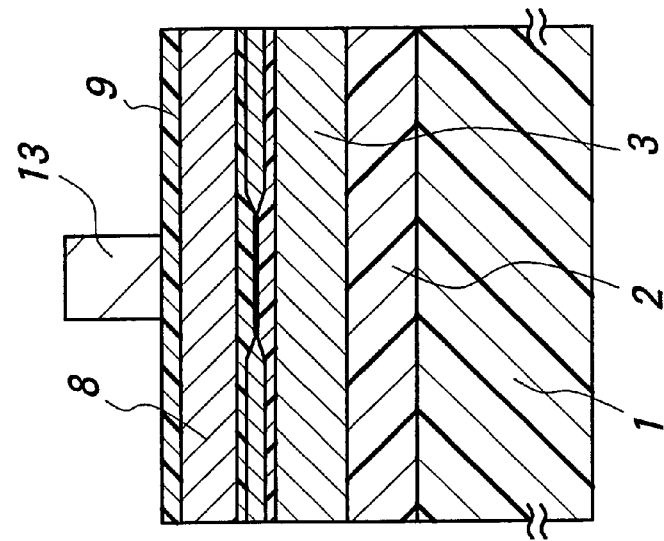
Figure 7B:
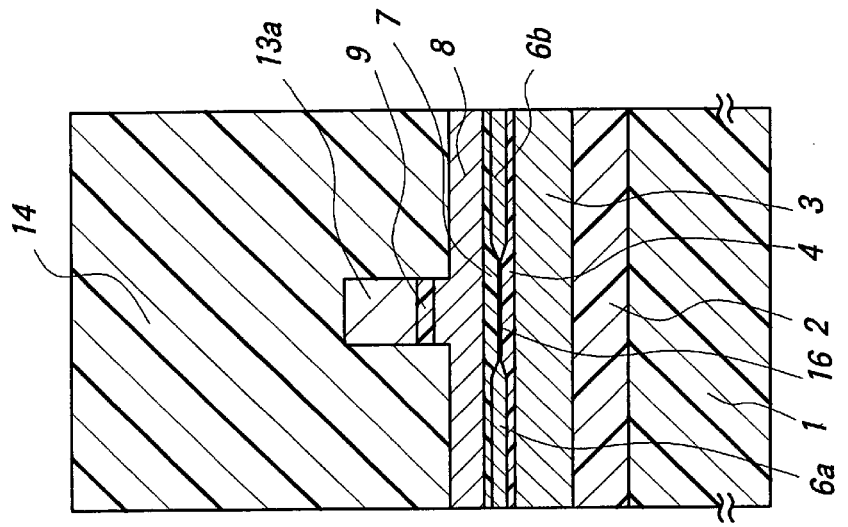
Figure 7A:
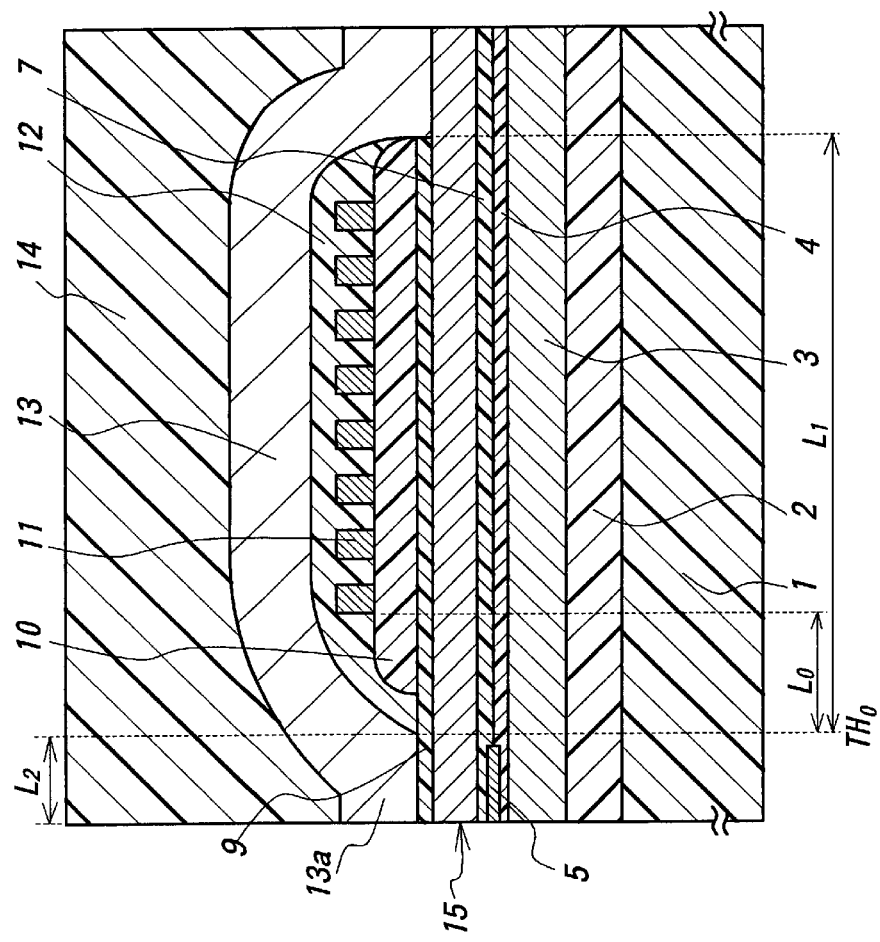
Figure 8A:
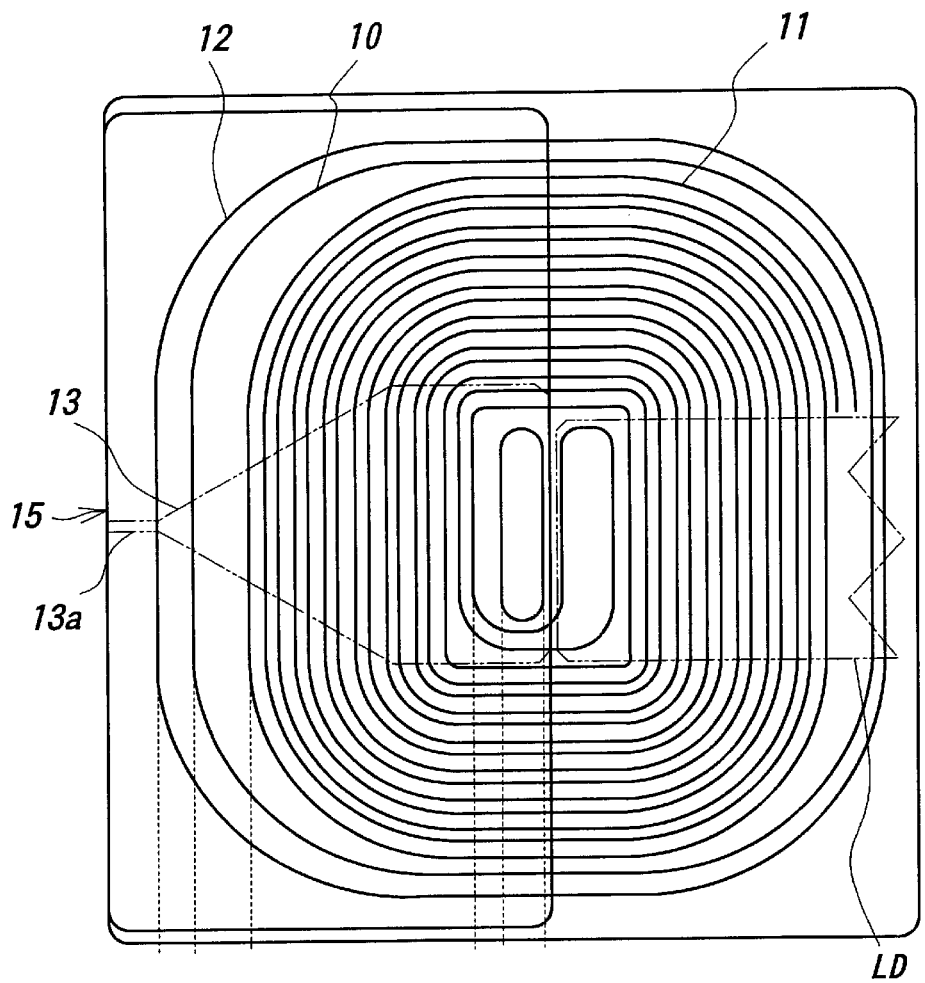
FIGS. 8A, 8B and 8C are plan and cross sectional views illustrating the known combination type thin film magnetic head while a part of which is removed.
Figure 8B:
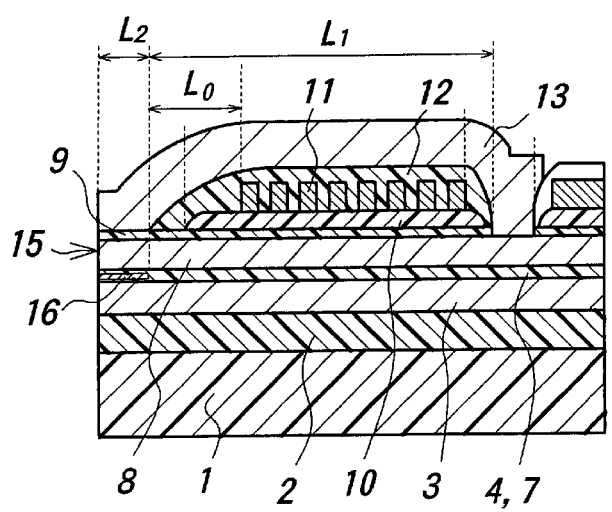
Figure 8C:
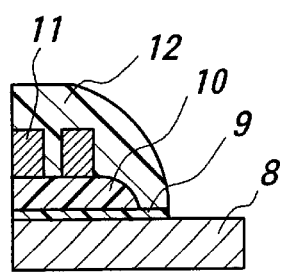
Figure 9B:
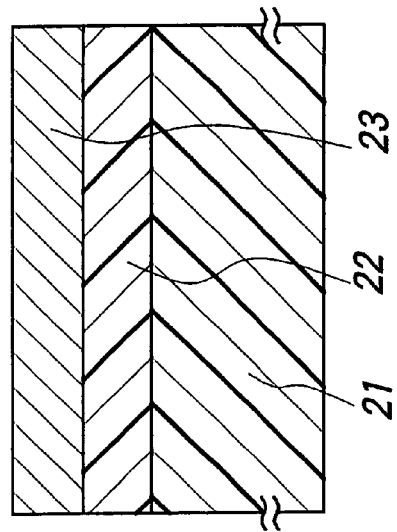
Figure 9A:
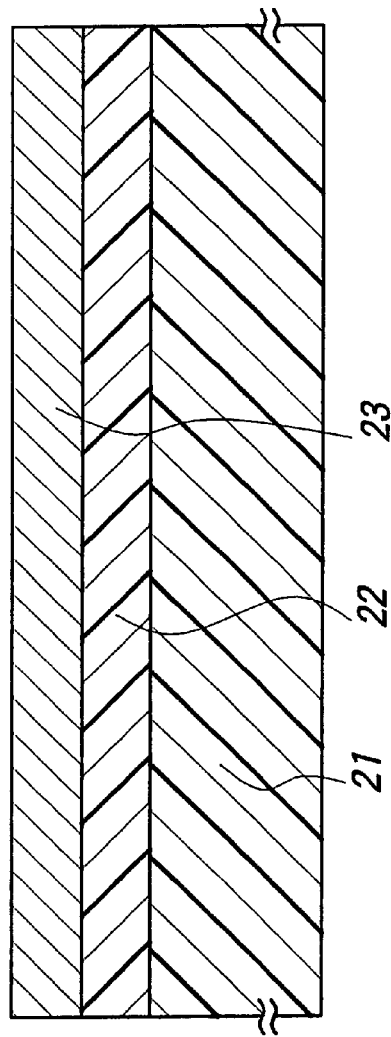

At first, as shown in FIGS. 9A–B, an insulating layer 22 made of alumina and having a thickness of a about 3–5 $\mu$m is deposited on one surface of a substrate main body 21 made of AlTiC. These substrate main body 21 and insulating layer 22 constitute a substrate or wafer. In the present specification, the insulating layer means a layer having at least an electrically insulating property and may or may not have a non-magnetic property. However, in general, materials such as alumina having both the electrically insulating property and the non-magnetic property are used as the insulating layer, and thus the insulating layer and non-magnetic layer are used to denote the same layer. Furthermore, a bottom shield 23 made of a permalloy for the magnetoresistive type thin film magnetic head is formed on the insulating layer 22 of the substrate with a thickness of about 3 $\mu$m. The bottom shield layer 23 is formed into a desired pattern by means of a plating method using a photoresist mask.

Subsequently, as illustrated in FIGS. 10A–B, a GMR layer 25 and lead electrodes 26a, 26b are formed on the bottom shield layer 23 such that they are embedded in shield gap layers 24, 27. These shield gap layers 24, 27 have a thickness of about 0.2 $\mu$m. On the shield gap layers 24, 27 in which the GMR layer 25 and lead electrodes 26a, 26b are embedded, is formed a first magnetic layer 28 made of a permalloy with a thickness of 2–3.5 $\mu$m, said first magnetic layer serves both as a top shield for the GMR layer and as a bottom pole of the inductive type thin film magnetic head.

Then, after forming a photoresist pattern on the first magnetic layer 28, an ion beam etching using an argon gas or reactive ion etching is performed while the photoresist pattern is used as a mask, and a recess 28a having a depth of about 0.8–1.5 $\mu$m is formed in a surface of the first magnetic layer 28. Next, a write gap layer 29 made of an alumina is formed on a whole surface of the first magnetic layer with a thickness of 0.2–0.25 $\mu$m as depicted in FIGS. 11A–B. At a center of the recess 28a there is formed a protrusion 28b. As will be explained later, at the protrusion 28b, there is formed a back gap magnetically coupling bottom and top poles with each other.

Next, as shown FIGS. 12A–B, a thin film coil 30 is formed within the recess 28a via the write gap layer 29 as illustrated in FIGS. 12A–B. The thin film coil 30 is formed by a known method. A seed layer made of copper is formed on a whole surface and a photoresist pattern is formed on the seed layer, and then thin film coil formed by the electroplating of copper such that a thickness is 1–2 $\mu$m and a coil pitch is 1.2–2.0 $\mu$m. In this manner, thin film coil 30 is formed in the recess 28a of the first magnetic layer 28 such that substantially 50–80% of a height of the thin film coil is sank in the recess. At an innermost portion of the thin film coil 30, there is formed a connecting portion 30a for connecting the thin film coil to an external circuit.

Next, after removing the photoresist pattern and removing the remaining seed layer by etching, a first photoresist insulating layer 31 is formed such that the coil windings of the thin film coil 30 are supported by the insulating layer in an electrically separating manner as shown in FIGS. 13A–B. In the present embodiment, the first photoresist insulating layer 31 is formed such that a part of the thin film coil 30 is exposed, but the first photoresist layer may be formed to have a sufficiently large thickness such that the thin film coil is completely covered with the photoresist insulating layer. However, even in the latter case, the throat height zero reference position is not defined by an outer edge of the photoresist insulating layer 31 and the apex angle is not defined by the photoresist insulating layer.

Then, a second photoresist insulating layer 32 is formed such that the first photoresist layer 31 is covered with the second photoresist insulating layer 32, the throat height zero reference position is defined by an outer edge of the second photoresist insulating layer 32 and the apex angle is determined by the second photoresist insulating layer 32. According to the present invention, since the thin film coil 30 is formed to be partly embedded in the recess 28a of the second magnetic layer 28, the apex angle θ can be small such as 20–30°, and therefore the photolithography for forming the fine structure of a top pole chip later can be performed very precisely. Moreover, a distance $L_0$ from the throat height zero reference position $TH_0$ to the outer edge of the thin film coil 30 can be shortened to improve the recording efficiency. Furthermore, by reducing the distance $L_0$, it is also possible to shorten a magnetic path length $L_1$ to improve the NLTS and high frequency properties.

Next, as depicted FIGS. 14A–B, after selectively removing a portion of the write gap layer 30 situating above the connecting portion 30a formed at the innermost position of the thin film coil 30, a third magnetic layer 33 made of a magnetic material having a high saturation magnetic flux density such as NiFe (80%. 20%) and FeN is formed with a thickness of 2–3 μm. The third magnetic layer 33 includes a pole portion 33a which constitutes the top pole chip and may be shaped into a desired pattern by the plating method or by the dry etching after sputtering. Since a width of a record track is defined by a width of the pole portion 33a of the third magnetic layer 33, and therefore the pole portion is formed to have a narrow width such as 0.5 μm. As explained above, according to the present invention, since the apex angle θ can be made small, the fine structure can be accurately formed without being affected by undesired reflection during the photolithography. During the formation of the third magnetic layer 33, a connecting portion 33a is formed on the connecting portion 30a of the thin film coil 30.

Next, as shown in FIGS. 15A–B, the write gap layer 29 is selectively removed by the reactive ion etching using a fluorine gas such as $CF_4$ and $SF_6$ or a chlorine gas such as $BCl_2$ and $Cl_2$, while the pole portion 33a of the third magnetic layer 33 is used as a mask. Then, an exposed surface portion of the second magnetic layer 28 is selectively removed by the argon ion beam etching to form the trim structure. Next, an overcoat layer 34 made of an alumina is formed on a whole surface with a thickness of about 20–40 μm.

In an actual manufacturing process, after forming a number of combination type thin film magnetic heads on the wafer in matrix, the wafer is divided into a plurality of bars, then a bar is polished to form air bearing surfaces 35, and finally the bar is divided into individual combination type thin film magnetic heads. A front end of the pole portion 33a of the third magnetic layer 33 is also polished during the polishing process for forming the air bearing surfaces, and a throat height TH is determined by a distance from the throat height zero reference position $TH_0$ to the air bearing surface 35 and a MR height MR of a GMR element 36 is determined by polishing the GMR layer 25.

Figure 16A:
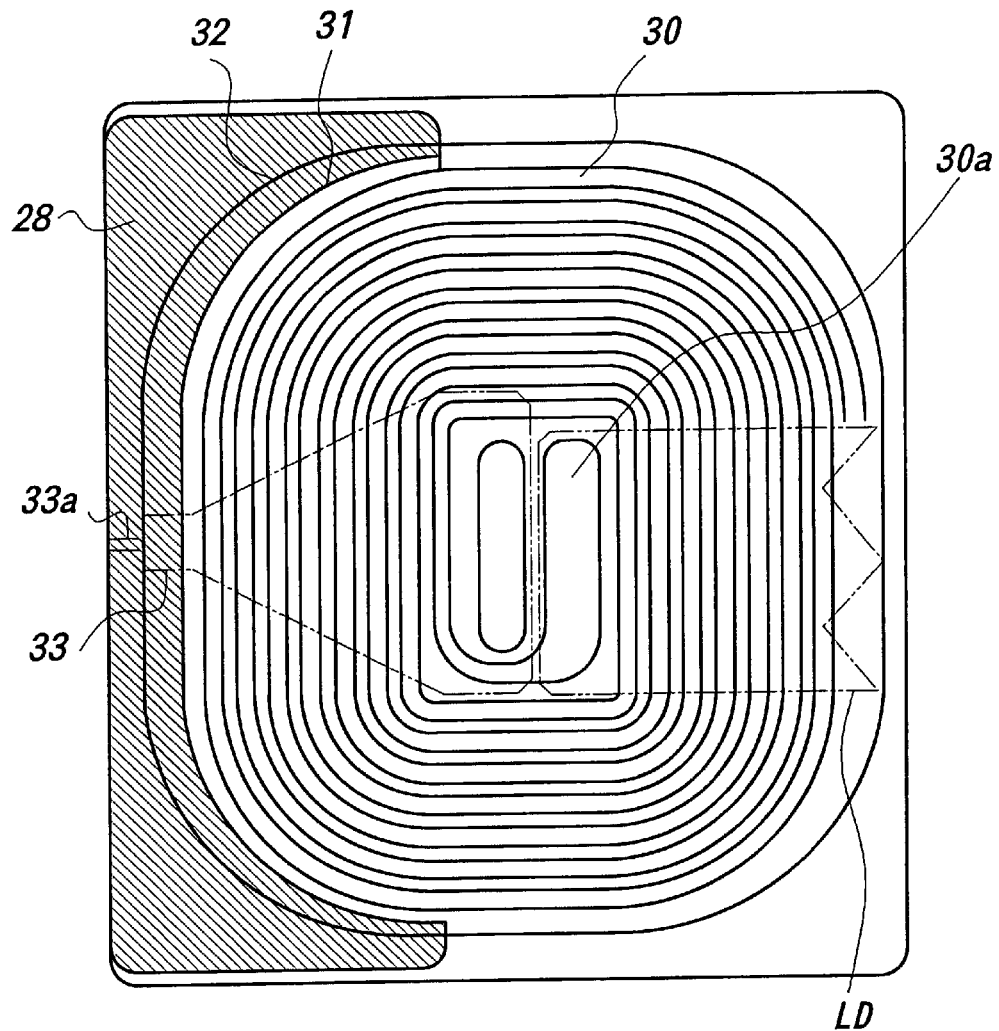
FIGS. 16A and 16B are plan and cross sectional views showing the structure of the first embodiment of the thin film magnetic head.
Figure 16B:
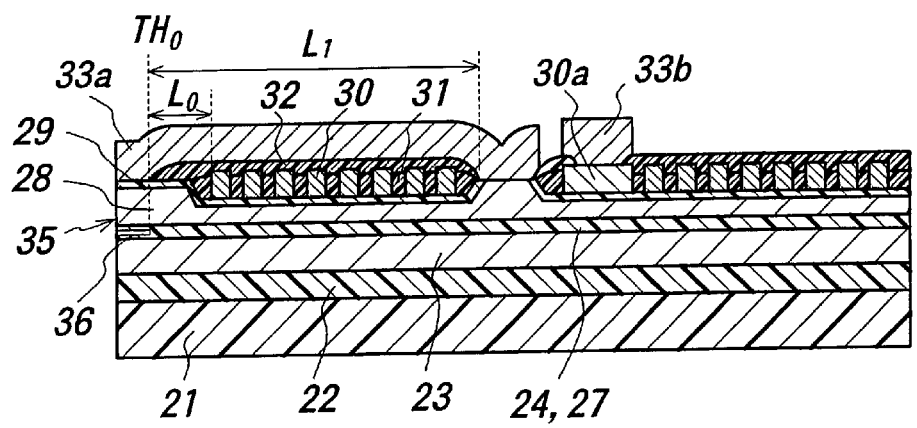

FIG. 16A is a plan view showing the structure of the first embodiment of the thin film magnetic head according to the invention, while the overcoat layer 34 is removed, a lead member LD for connecting the innermost coil winding of the thin film coil 30 to an external circuit by means of the connecting portions 30a and 33b is denoted by an imaginary line, and contours of the first and second insulating layers 31 and 32 are denoted by solid lines. FIG. 16B is a cross sectional view. According to the invention, as explained above, the thin film coil 30 is formed such that a part of the thin film coil is embedded in the recess 28a formed in the surface of the second magnetic layer 28 constituting the lower pole, and the upper second insulating layer 32 among the first and second insulating layers 31 and 32 supporting the thin film coil in an electrically insulating manner is formed to extend outwardly beyond the recess 28a to define the throat height zero reference position $TH_0$ by the outer edge. It should be noted that in FIG. 16A, a portion denoted by hatching a high level portion of the second magnetic layer 28 except for the recess 28a.

According to the present invention, the thin film coil 30 is formed to be partially embedded in the recess 28a of the second magnetic layer 28, and thus the second insulating layer 32 can be thin. Therefore, the apex angle θ defined by an inclination angle of the outer side wall of this insulating layer can be small not larger than about 20–30°, and at the same time, the distance $L_0$ from the throat height zero reference position $TH_0$ to the outer edge of the thin film coil 30 can be shortened such as about 2 μm. Therefore, the photolithography for forming the pole portion 33a of the third magnetic layer 33 can be performed precisely, and a width of the pole portion 33a can be narrowed in sub-micron order. This results in that the write track width can be made small and the surface recording density on a record medium can be improved. Furthermore, since the distance $L_0$ from the throat height zero reference position $TH_0$ to the outer edge of the thin film coil 30 can be reduced such as about 2 μm, the magnetic path length $L_1$ defined by a distance from the throat height zero reference position $TH_0$ to the inner edge of the insulating layers 31, 32 supporting the thin film coil 30 can be also shortened such as about 19 μm to improve the NLTS and high frequency property. As stated above, since the distance $L_0$ from the throat height zero reference position $TH_0$ to the outer edge of the thin film coil 30 can be shortened, the recording efficiency can be improved.

Figure 17B:
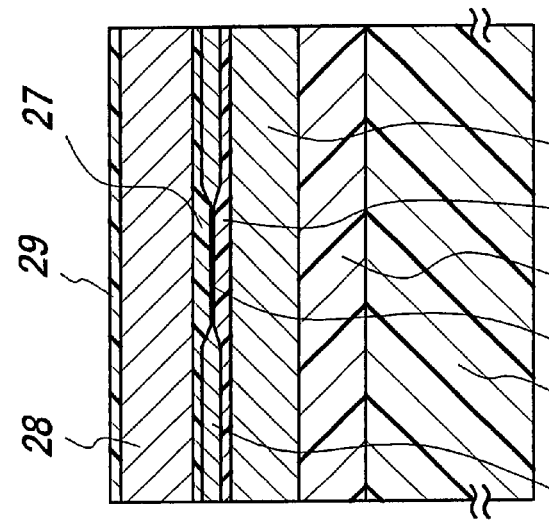
Figure 17A:
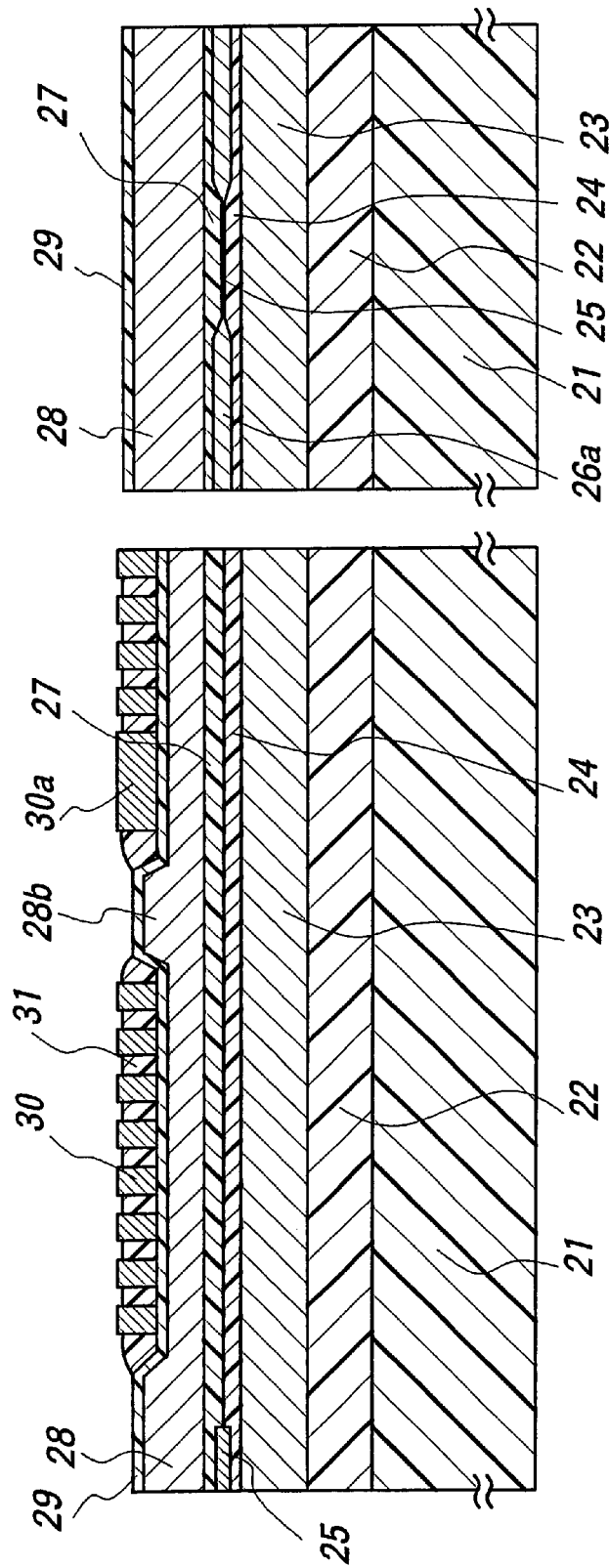

FIGS. 17A–20B are cross sectional views showing successive steps of the method of manufacturing a second embodiment of the thin film magnetic head according to the invention. In the present embodiment, portions similar to those of the first embodiment are denoted by the same reference numerals used in the first embodiment and their detailed explanation is dispensed with. As shown in FIGS. 17A–B, steps of forming the thin film coil 30 in the recess 28a of the second magnetic layer 28 and forming the first photoresist insulating layer 31 such that the coil windings are supported in a mutually separated and electrically isolated manner are same as those of the previous embodiment. In the present embodiment, after forming the first photoresist insulating layer 31, a second inorganic insulating layer 41 made of an inorganic material such as alumina, silicon oxide and silicon nitride is formed with a thickness of, for instance 0.8–1.5 μm as illustrated in FIGS. 18A–B, and then the inorganic insulating layer is shaped into a given pattern by means of the reactive ion etching using a fluorine gas or chlorine gas such that an inclination angle of its outer side wall, i.e. an apex angle θ is set to a value not larger than 30° and its outer edge situates at the throat height zero reference position.

Next, as depicted in FIGS. 19A–B, a write gap layer 42 made of an alumina, silicon oxide and silicon nitride is formed such that an exposed portion of the second magnetic layer 28 and the second inorganic insulating layer 41 are covered with the write gap layer. Succeeding steps are substantially identical with those of the first embodiment. As shown in FIGS. 20A–B, after forming the third magnetic layer 33 and overcoat layer 34, the air bearing surface 35 is formed by polishing and the GMR element 36 is formed by the same process. In the present embodiment, since the second insulating layer 41 defining the throat height zero reference position $TH_0$ is made of an inorganic insulating material, this reference position could not be shifted during the manufacturing process. In this manner, the throat height zero reference position $TH_0$ which has a large influence upon performance of the thin film magnetic head can be formed accurately without departing from a designed position.

FIGS. 21A–B is a cross sectional view showing a third embodiment of the thin film magnetic head according to the invention. In the above explained first and second embodiments, after forming the thin film coil 30, the first insulating layer 31 supporting the coil windings is made of a photoresist, but in the present embodiment, the first insulating layer is formed by a spin-on-glass (SOG) layer 51 which is widely used in the manufacturing process for forming a multi-layer wiring pattern in a semiconductor device. Since the SOG layer has a small thermal expansion coefficient, the upper pole constituted by the third magnetic layer 33 can be prevented from being projected outwardly during the operation of a hard disk drive including the thin film magnetic head.

Figures 22A, 22B:
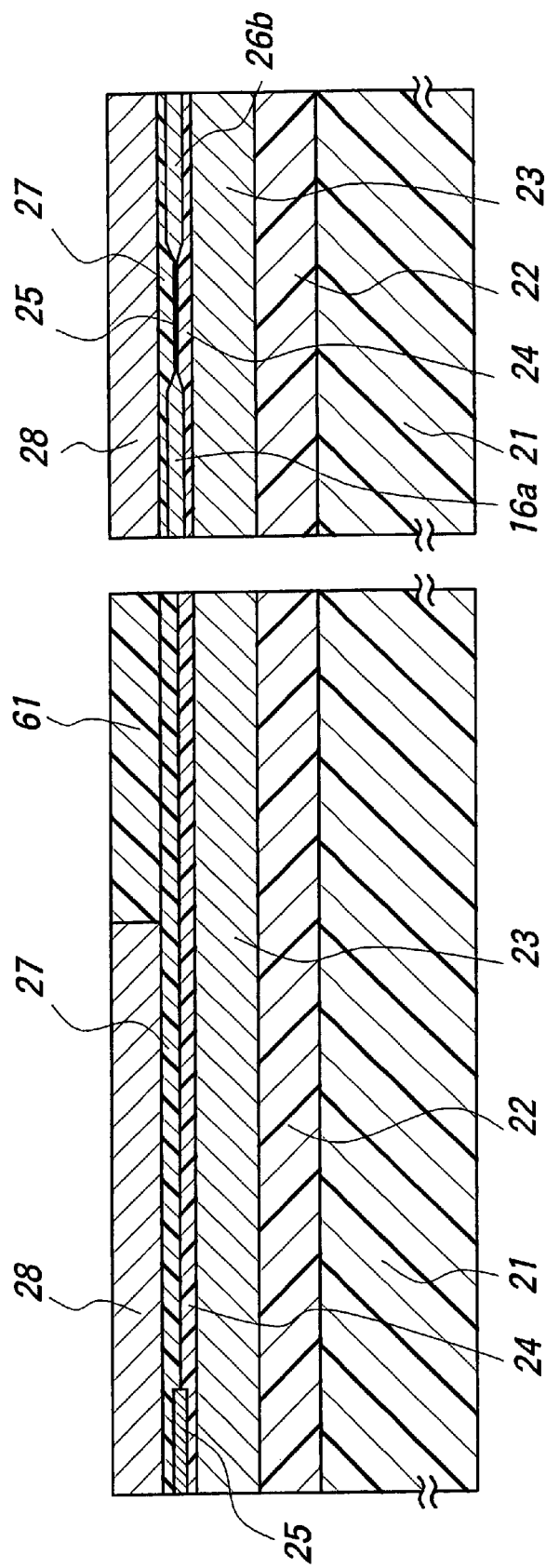

FIGS. 22A–26B are cross sectional views showing successive steps of the method of manufacturing a fourth embodiment of the thin film magnetic head according to the invention. As illustrated in FIG. 22, after forming the first magnetic layer 23 forming the bottom shield on the insulating layer 22 constituting the substrate and forming the GMR layer 25 embedded in the shield gap layers 24, 27, the second magnetic layer 28 is formed, and after patterning this layer, an inorganic layer 61 made of an alumina, silicon oxide or silicon nitride is formed on a whole surface. Then, the inorganic layer 61 is polished by CMP (chemical mechanical polishing) to expose a flat surface of the second magnetic layer 28.

Next, as illustrated in FIGS. 23A–B, a bottom pole chip 62 is formed on a front portion of the second magnetic layer 28 with a thickness of about 1–2 μm as well as a coupling portion 62a at a rear portion. The bottom pole chip 62 is formed by an electroplated metal film of a metal having a high saturation magnetic density such as NiFe (80%: 20%) and FeN (45%: 55%), but it may be formed by selectively patterning a sputtered layer of NFe and FeZrN by means of the ion milling. In the present embodiment, the first magnetic member having the recess is constituted by the flat second magnetic layer 28 and bottom pole chip 62.

Next, as shown in FIGS. 24A–B, an insulating layer 63 made of an alumina is formed on a whole surface with a thickness of about 0.3–0.6 μm, then the thin film coil 30 is formed with a thickness of 1–2 μm on the second magnetic layer 28, and after forming an insulating layer 64 made of an alumina such that the coil windings are supported in an electrically isolated manner, the surface of the insulating layer 64 is flattened by CMP to expose the bottom pole chip 62 and a write gap layer 65 made of an alumina is formed on the thus flattened surface with a thickness of 0.2–0.3 μm. The above mentioned inorganic insulating layer 64 may be formed by the alumina CVD having a good step coverage.

Then, as depicted in FIGS. 25A–B, a photoresist insulating layer 66 is formed on the flat surface of the write gap layer 65 such that an outer edge of the insulating layer 66 is extended above the bottom pole chip 62 via the write gap layer 65. The throat height zero reference position $TH_0$ is determined by the outer edge of the photoresist insulating layer 66. Furthermore, the third magnetic layer 33 is formed on the insulating layer such that the pole portion 33a of the third magnetic layer is opposed to the bottom pole chip 62 via the write gap layer 65 to constitute the write gap and a rear portion of the third magnetic layer is magnetically coupled with the second magnetic layer 28 via an opening formed in the write gap layer 65 as well as the coupling portion 62a to form the back gap.

Next, as shown in FIGS. 26A–B, after forming the overcoat layer 34, the air bearing surface 35 is formed by polishing and the GMR element 36 is formed. Also in the present embodiment, since the throat height zero reference position $TH_0$ is determined by the outer edge of the photoresist insulating layer 65 and the apex angle θ defined by an inclination angle of the outer side wall can be decreased, and at the same time, the distance $L_0$ from the throat height zero reference position $TH_0$ to the outer edge of the thin film coil 30 can be shortened. Therefore, the magnetic path length $L_1$ can be shortened, and thus similar advantages as those of the previous embodiments can be obtained.

FIGS. 27A–30B are cross sectional views showing successive steps of the method of manufacturing a fifth embodiment of the thin film magnetic head according to the invention. At first, as illustrated in FIG. 27, the first magnetic layer 23 forming the bottom shield is formed on the insulating layer 22 constituting the substrate, the GMR layer 25 is formed to be embedded in the shield gap layers 24, 27, the second magnetic layer 28 is formed, a bottom pole chip 62 is formed on a front portion of the second magnetic layer 28 with a thickness of about 1–2 μm and the coupling portion 62a is formed at a rear portion, the inorganic insulating layer 63 made of an alumina is formed on a whole surface with a thickness of about 0.3–0.6 μm, a photoresist insulating layer 71 having a given pattern is formed on the second magnetic layer 28, and then the thin film coil 30 is formed to have a thickness of 1–2 μm by the electroplating.

Next, as shown in FIGS. 28A–B, after removing the photoresist insulating layer 71, an inorganic insulating film 72 made of an alumina is formed with a thickness of 3–4 μm such that the coil windings of the thin film coil 30 are supported by this insulating layer in an electrically isolated manner. Then, a surface is flattened by CMP to expose a flat surface of the bottom pole chip 62. The inorganic insulating layer 72 may be formed by the alumina CVD having a superior step coverage.

Next, as shown in FIGS. 29A–B, after forming a photoresist insulating layer 73 on the thus flattened surface such that an outer edge of the insulating layer 73 is extended above the bottom pole chip 62, a write gap layer 74 made of an alumina is formed on a whole surface with a thickness of 0.2–0.3 μm, and then the third magnetic layer 33 is formed thereon. The pole portion 33a of the third magnetic layer 33 is opposed to the bottom pole chip 62 via the write gap layer 74 to constitute the write gap and is magnetically coupled with the second magnetic layer 28 via an opening formed in the write gap layer 74 to form the back gap.

Next, as shown in FIGS. 30A–B, the trim structure is formed by performing the etching, while the pole portion 33a of the third magnetic layer 33 is as a mask. Then, after forming the overcoat layer 34, the air bearing surface 35 is formed by polishing and the GMR element 36 is also formed. In the present embodiment, since the throat height zero reference position $TH_0$ is accurately determined by the outer edge of the photoresist insulating layer 74 and the apex angle θ defined by an inclination angle of the outer side wall can be decreased, the distance $L_0$ from the throat height zero reference position $TH_0$ to the outer edge of the thin film coil 30 can be shortened, and thus the magnetic path length $L_1$ can be shortened. Therefore, similar advantages as those of the first to fourth embodiments can be equally obtained.

FIGS. 31A–34B are cross sectional views illustrating successive steps of the method of manufacturing a sixth embodiment of the thin film magnetic head according to the invention. Like as the first embodiment, after forming a first layer thin film coil 81 and a connecting portion 81a on the write gap layer 29 such that the first layer thin film coil is embedded in the recess 28a of the second magnetic layer 28 as shown in FIG. 31A, the first photoresist insulating layer 31 is formed such that coil windings of the first layer thin film coil are supported by the insulating layer in an electrically isolated manner. Then, the second photoresist insulating layer 32 is formed such that the throat height zero reference position $TH_0$ as well as the apex angle θ are defined thereby.

Figure 32B:
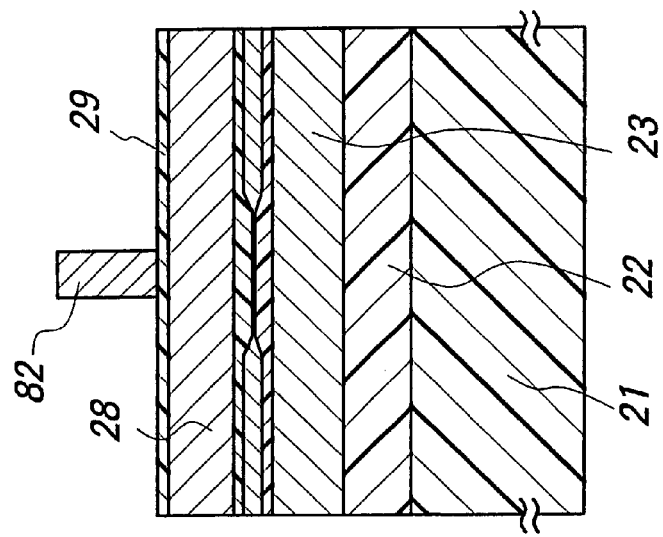
Figure 32A:
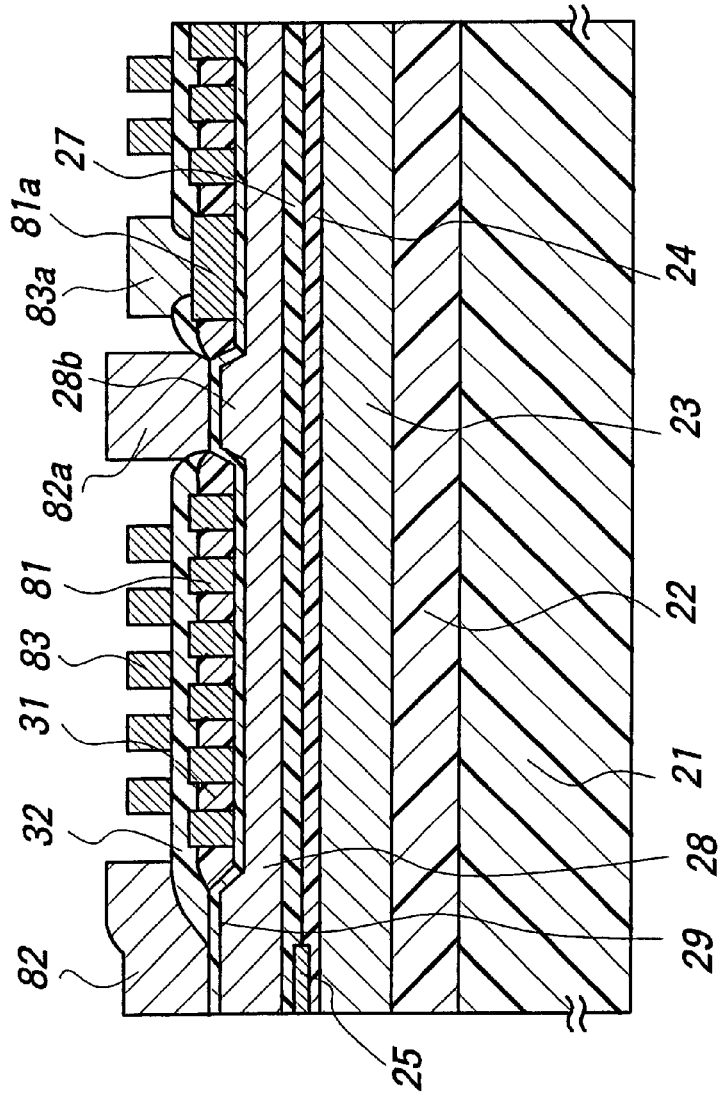

Next as shown in FIGS. 32A–B a top pole chip 82 is formed with a thickness of about 2–3 μm. During this process, a coupling portion 82a is formed above the coupling portion 28b of the second magnetic layer 28. Next, the trim structure is formed by performing the etching while the top pole chip 82 is used as a mask. Furthermore, a second layer thin film coil 83 is formed on the on the second photoresist layer 32 above the recess 28a. In FIG. 32, a photoresist pattern formed for the etching process is removed.

Subsequently, as depicted in FIGS. 33A–B, an inorganic insulating layer 84 made of an inorganic material such as alumina, silicon oxide and silicon nitride is formed, and then a surface is flattened by CMP to expose the upper surface of the top pole chip 82. In this case, the second layer thin film coil 83 is not exposed and is still embedded in the inorganic insulating layer 84.

Furthermore, as shown in FIGS. 34A–B, on the flat coplanar surface of the top pole chip 82 and inorganic insulating layer 84, is formed a flat third magnetic layer 85 constituting the top pole, and then the overcoat layer 34 is formed. Then, the air bearing surface 35 is formed by polishing, and the GMR element 36 is formed. Also in the present embodiment, the throat height zero reference position $TH_0$ is accurately determined by the outer edge of the photoresist insulating layer 32 formed on the flat surface and the apex angle θ is determined by an inclination angle of the outer side wall of this insulating layer 32, and therefore the apex angle θ can be decreased, and the distance $L_0$ from the throat height zero reference position $TH_0$ to the outer edge of the thin film coil 30 can be shortened, and thus the magnetic path length $L_1$ can be shortened. Therefore, similar advantages as those of the first embodiment can be equally obtained. Moreover, in the present embodiment, a front portion of the third magnetic layer 85 constituting the top yoke is retarded inwardly from the air bearing surface 35, and therefore a side fringe due to a leakage of a magnetic flux can be reduced. This also contributes to the decrease in the track width.

FIGS. 35A–39B are cross sectional views showing successive steps of the method of manufacturing a seventh embodiment of the thin film magnetic head according to the invention. Like as the first embodiment, the thin film coil 30 and connecting portion 30a are formed on the insulating layer 29 such that they are partially embedded in the recess 28a formed in the surface of the second magnetic layer 28 as shown in FIGS. 35A–B.

Figure 37B:
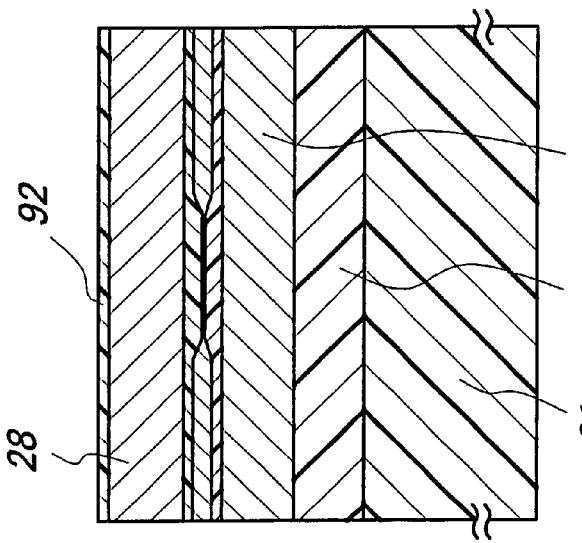
Figure 37A:
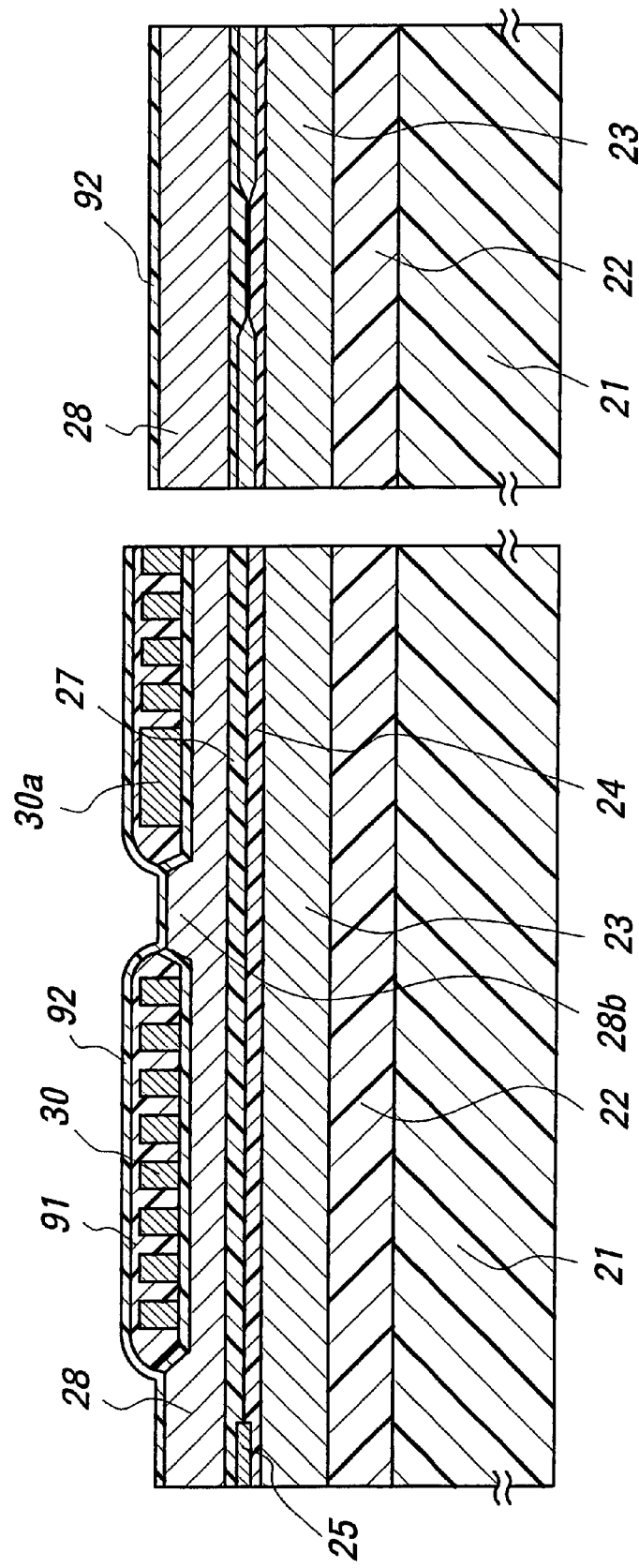

Then, a photoresist insulating layer 91 for supporting the coil windings in an electrically isolated manner is formed such that the thin film coil is completely covered with the insulating layer. Next, as depicted in FIGS. 37A–B, after forming a write gap layer 92, a second photoresist insulating layer 93 is formed such that the throat height zero reference position $TH_0$ and apex angle θ are defined, and the third magnetic layer 33 is formed as shown in FIGS. 38A–B.

Next, as illustrated in FIGS. 39A–B, after forming the overcoat layer 34, the air bearing surface 35 is formed by polishing, and at the same time, the GMR element 36 is formed. Also in the present embodiment, the throat height zero reference position $TH_0$ is accurately determined by the outer edge of the second photoresist insulating layer 93 and the apex angle θ is determined by an inclination angle of the outer side wall of this insulating layer 93. Therefore, the apex angle θ can be decreased, and the distance $L_0$ from the throat height zero reference position $TH_0$ to the outer edge of the thin film coil 30 can be shortened, as a result of which the magnetic path length $L_1$ can be shortened. Therefore, similar advantages as those of the above explained embodiments can be equally obtained.

Figure 40A:
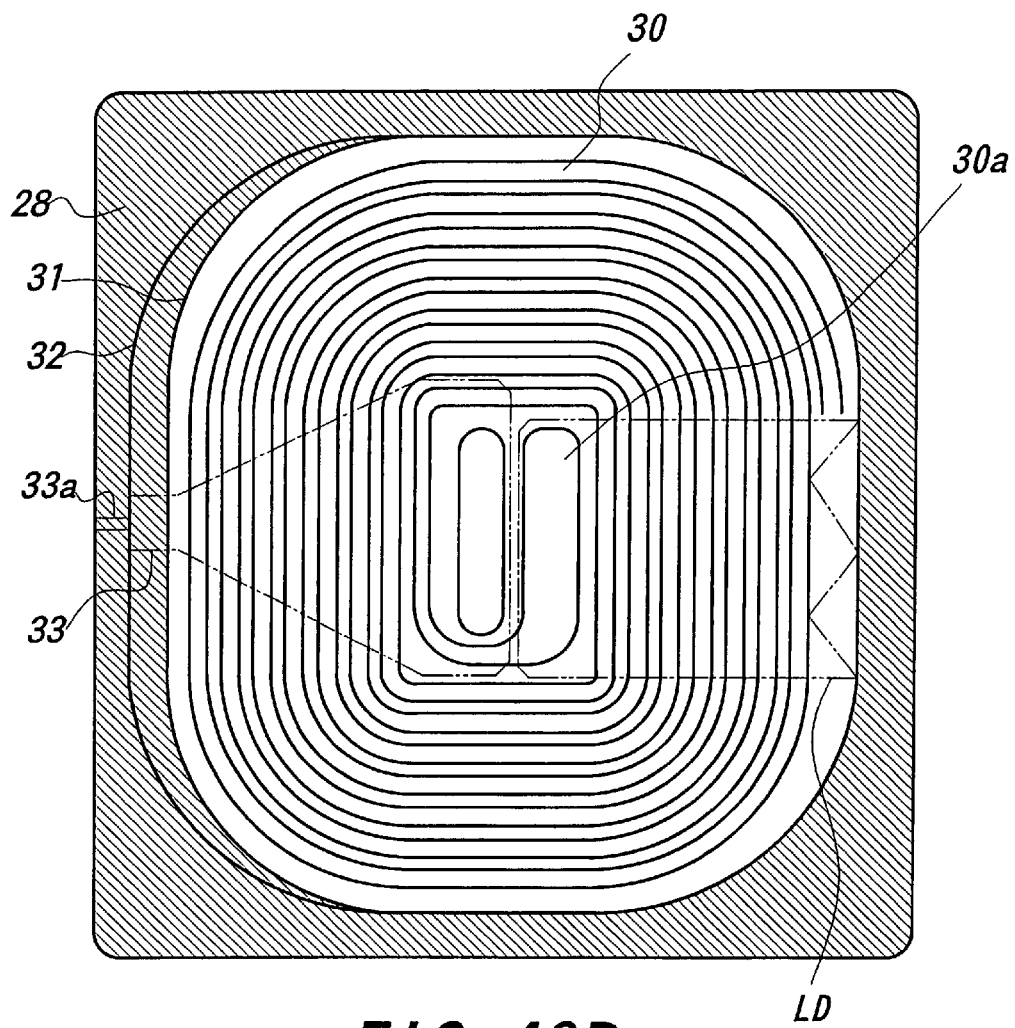
FIGS. 40A and 40B are plan and cross sectional views showing a modified embodiment of the thin film magnetic head according to the invention.
Figure 40B:
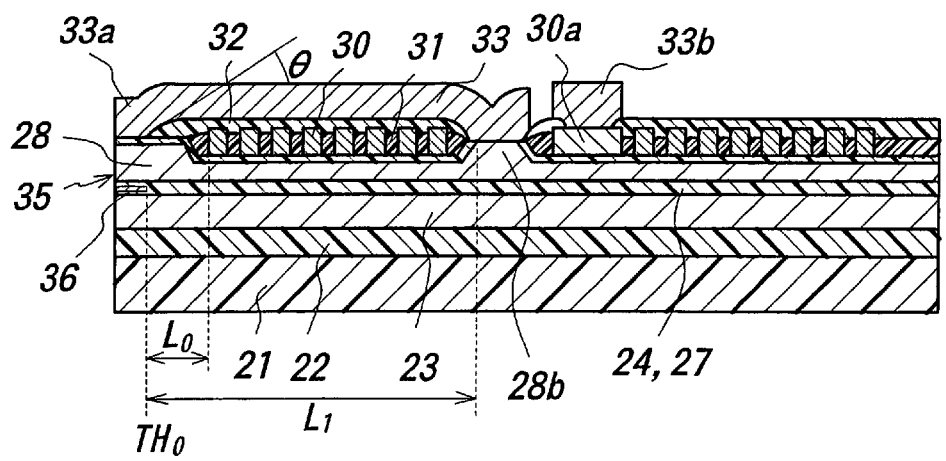
Figure 41A:
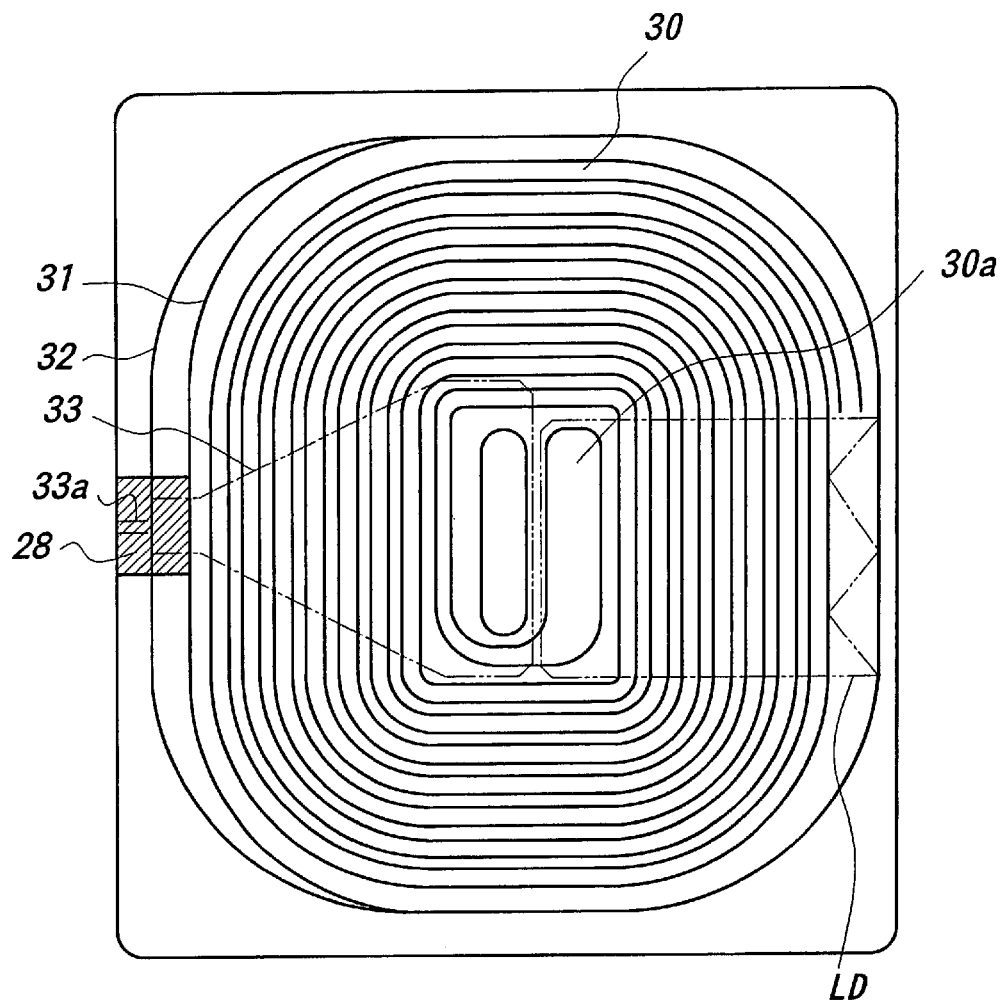
FIGS. 41A and 41B are plan and cross sectional views illustrating another modified embodiment of the thin film magnetic head according to the invention.
Figure 41B:
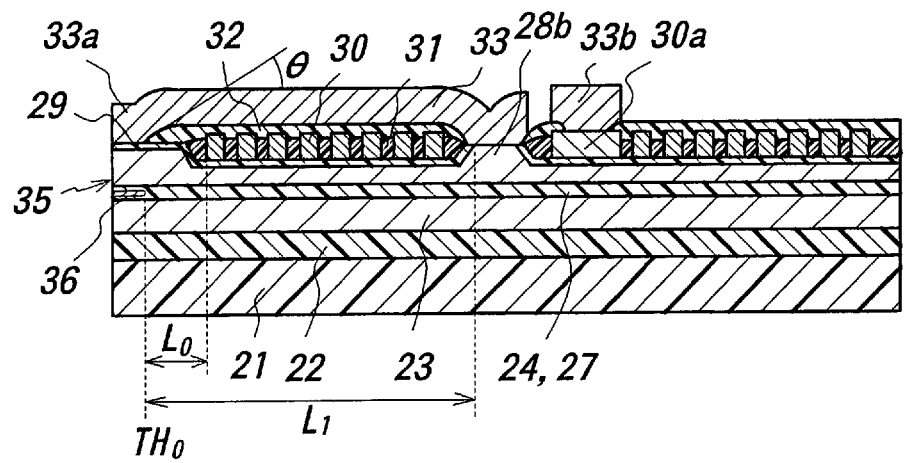

The present invention is not limited to the embodiments explained above, but many alternations and modifications can be conceived by a person skilled in the art within the scope of the invention. For instance, in the above explained first embodiment, the recess 28a is formed to have a large surface area of the second magnetic layer 28 except for an area denoted by hatching in FIG. 16A, said hatched portion including the bottom pole chip and having a larger thickness. But, the recess 28a may be formed to surround the recess 28a and a remaining surface area may have a large thickness as shown FIGS. 40A–B. Furthermore, as illustrated in FIGS. 41A–B, the recess 28a may be formed in a larger surface area except for a small portion constituting the bottom pole chip.

In the above embodiments, the thin film magnetic head is constructed as the combination type thin film magnetic head in which the magnetoresistive type reading thin film magnetic head is provided on the substrate and then the inductive type writing thin film magnetic head is stacked thereon, but according to the invention, a stacking order of these thin film magnetic heads may be reversed. Moreover, in the above embodiments, the magnetoresistive element is formed by the GMR element, but it may be formed by the AMR element or TMR element (tunneling magnetoresistive element). Furthermore, according to the invention, the reading thin film magnetic head may be constructed by any other type of reading thin film magnetic head than the magnetoresistive type thin film magnetic head. Further, it is not always necessary to provide the reading thin film magnetic head, but only the inductive type writing thin film magnetic head may be provided.

In the thin film magnetic head and the method of manufacturing the same according to the invention, at least a part of the thin film coil is embedded in the recess of the first magnetic member constituting the bottom pole chip and bottom pole, and the insulating member supporting the coil windings of the thin film coil in an electrically insulating manner is extended beyond the periphery of the recess up to the throat height zero reference position. Therefore, the apex angle θ can be reduced such as 20–30° even by decreasing the distance $L_0$ from the throat height zero reference position to the outer periphery of the thin film coil. Then, during the formation of the fine structure of the top pole chip and top pole, undesired deformation of the pattern due to the reflection can be mitigated and a write track width of submicron order can be realized to minimize the track width. Moreover, the thin film magnetic head can be manufactured with a high reproducibility and high yield. Since the magnetic path length defined by a distance from the throat height zero reference position to the inner edge of the insulating member supporting the coil windings of the thin film coil in an electrically insulating manner can be also shortened, and the NLTS and high frequency properties can be improved. Furthermore, since the outer edge of the thin film coil can be closer to the air bearing surface, the recording efficiency can be also improved.

Furthermore, when the insulating member for supporting the coil windings of the thin film coil is formed by the first insulating layer supporting the coil windings and the second insulating layer formed on the first insulating layer such that the throat height zero reference position is determined by its outer edge and the apex angle θ is determined by an inclination angle of the side wall, the throat height zero reference position and apex angle θ can be accurately defined, and the fine structure can be manufactured with a sufficiently high precision.

As stated above, since the apex angle θ can be reduced, the distance from the outer edge of the thin film coil to the throat height zero reference position can be shortened and the thin film coil can be small, the thin film magnetic head can be miniaturized and light, and the hard disk drive can be small in size and light in weight.

What is claimed is:

1. A thin film magnetic head comprising:

a substrate;

a first magnetic member supported by said substrate and having a recess formed in a surface thereof, said surface being opposite to a surface on which the first magnetic member is supported by the substrate, and said recess being formed at an inner position than a throat height zero reference position;

a thin film coil a part of which is provided in said recess which is formed in the surface opposite to the surface on which the first magnetic member is supported by the substrate, said thin film coil including a plurality of coil windings;

an insulating member supporting said plurality of coil windings of the thin film coil and extending externally beyond said recess, an outer edge of the insulating member defining said throat height zero reference position;

a second magnetic member formed on a surface of said insulating member remote from the substrate and including a pole portion extending up to an air bearing surface beyond said insulating member, a width of said pole portion defining a write track width; and a write gap layer provided at least between said first magnetic member and said second magnetic member, wherein said insulating member is formed by a first insulating layer supporting the coil windings of the thin film coil in the recess, and a second insulating layer extending outwardly beyond the recess such that said throat height zero reference position is defined by an outer edge of the second insulating layer, said write gap layer is formed also between said first magnetic layer and said thin film coil.

2. A thin film magnetic head according to claim 1, wherein said first and second insulating layers are formed by photoresist insulating layers.

3. A thin film magnetic head according to claim 1, wherein said first insulating layer is formed by a photoresist insulating layer and said second insulating layer is formed by an inorganic insulating layer.

4. A thin film magnetic head according to claim 1, wherein said first insulating layer is formed by an inorganic insulating layer and said second insulating layer is formed by a photoresist insulating layer.

5. A thin film magnetic head according to claim 1, wherein said first insulating layer is formed by a spin-on-glass insulating layer.

6. A thin film magnetic head according to claim 5, wherein said second insulating layer is formed by an inorganic insulating layer.

7. A thin film magnetic head according to claim 1, wherein said first insulating layer is formed such that a part of the thin film coil is exposed.

8. A thin film magnetic head according to claim 7, wherein said first insulating film is formed such that 50–80% of a height of the thin film coil is embedded in the recess.

9. A thin film magnetic head according to claim 1, wherein said first magnetic member is formed by a single magnetic layer.

10. A thin film magnetic head according to claim 1, wherein a magnetoresistive type thin film magnetic head is provided between said substrate and said first magnetic member.

11. A thin film magnetic head according to claim 1, wherein a magnetoresistive type thin film magnetic head is provided on a side of the second magnetic member opposite to said substrate.

* * * * *